(12) United States Patent
Abe et al.

(10) Patent No.: US 11,699,228 B2
(45) Date of Patent: Jul. 11, 2023

(54) ARRANGEMENT DETECTOR FOR PLATE-SHAPED OBJECT AND LOAD PORT INCLUDING SAME

(71) Applicant: TDK CORPORATION, Tokyo (JP)

(72) Inventors: Tomoshi Abe, Tokyo (JP); Tadamasa Iwamoto, Tokyo (JP); Takuya Kudo, Tokyo (JP)

(73) Assignee: TDK CORPORATION, Tokyo (JP)

( * ) Notice: Subject to any disclaimer, the term of this patent is extended or adjusted under 35 U.S.C. 154(b) by 294 days.

(21) Appl. No.: 17/239,223

(22) Filed: Apr. 23, 2021

(65) Prior Publication Data

US 2021/0334949 A1    Oct. 28, 2021

(30) Foreign Application Priority Data

Apr. 23, 2020 (JP) ................................. 2020-076675

(51) Int. Cl.
 *G06K 9/00* (2022.01)
 *G06T 7/00* (2017.01)
 *G06V 20/00* (2022.01)

(52) U.S. Cl.
 CPC .... *G06T 7/001* (2013.01); *G06T 2207/30148* (2013.01); *G06V 20/00* (2022.01)

(58) Field of Classification Search
 CPC . G06T 7/001; G06T 2207/30148; G06T 7/70; G06T 7/60; G06V 20/00; G06V 2201/06; H01L 21/67265; H01L 21/67775; H01L 21/681; H01L 21/67259
 See application file for complete search history.

(56) References Cited

U.S. PATENT DOCUMENTS

| | | | |
|---|---|---|---|
| 8,591,163 B2 * | 11/2013 | Toyoda | H01L 21/67775 414/940 |
| 2005/0035313 A1 | 2/2005 | Garssen et al. | |
| 2006/0131521 A1 | 6/2006 | Garssen et al. | |
| 2012/0281875 A1 | 11/2012 | Yasuda et al. | |
| 2013/0074615 A1 * | 3/2013 | Sasaki | H01L 21/67265 414/217 |
| 2013/0121564 A1 | 5/2013 | Kitamura et al. | |

(Continued)

FOREIGN PATENT DOCUMENTS

| | | |
|---|---|---|
| CN | 100444307 C | 12/2008 |
| CN | 102959355 A | 3/2013 |

(Continued)

*Primary Examiner* — Samir A Ahmed
(74) *Attorney, Agent, or Firm* — Oliff PLC

(57) ABSTRACT

An arrangement detector for plate-shaped objects and a lord port including the same are provided. The arrangement detector for plate-shaped objects includes a judgement window setting means, a shape determination means for determining a shape matching rate by superimposing the judgement window on the image captured by the imaging means, and an object judgement means for judging the plate-shaped objects do not exist in the judgement window overlaid on the image captured by the imaging means, in case that the shape matching rate determined by the shape determination means is equal to or less than a predetermined value. A first reference line is a continuous straight line in the judgement window, and a second reference line is a collection of discontinuous line segments linearly arranged in the judgement window.

8 Claims, 30 Drawing Sheets

(56) References Cited

U.S. PATENT DOCUMENTS

2015/0294888 A1* 10/2015 Iwamoto ........... H01L 21/67389
                                                    414/217.1
2016/0276189 A1*  9/2016 Igarashi ............ H01L 21/67775
2017/0243369 A1*  8/2017 Iida ........................... G06T 7/73
2019/0096728 A1*  3/2019 Iwamoto ........... H01L 21/67775

FOREIGN PATENT DOCUMENTS

| CN | 102576687 B   | 11/2015 |
|----|---------------|---------|
| JP | 2002-164411 A | 6/2002  |
| JP | 2019-102753 A | 6/2019  |
| KR | 101843476 B1  | 3/2018  |

\* cited by examiner

FIG.9B1
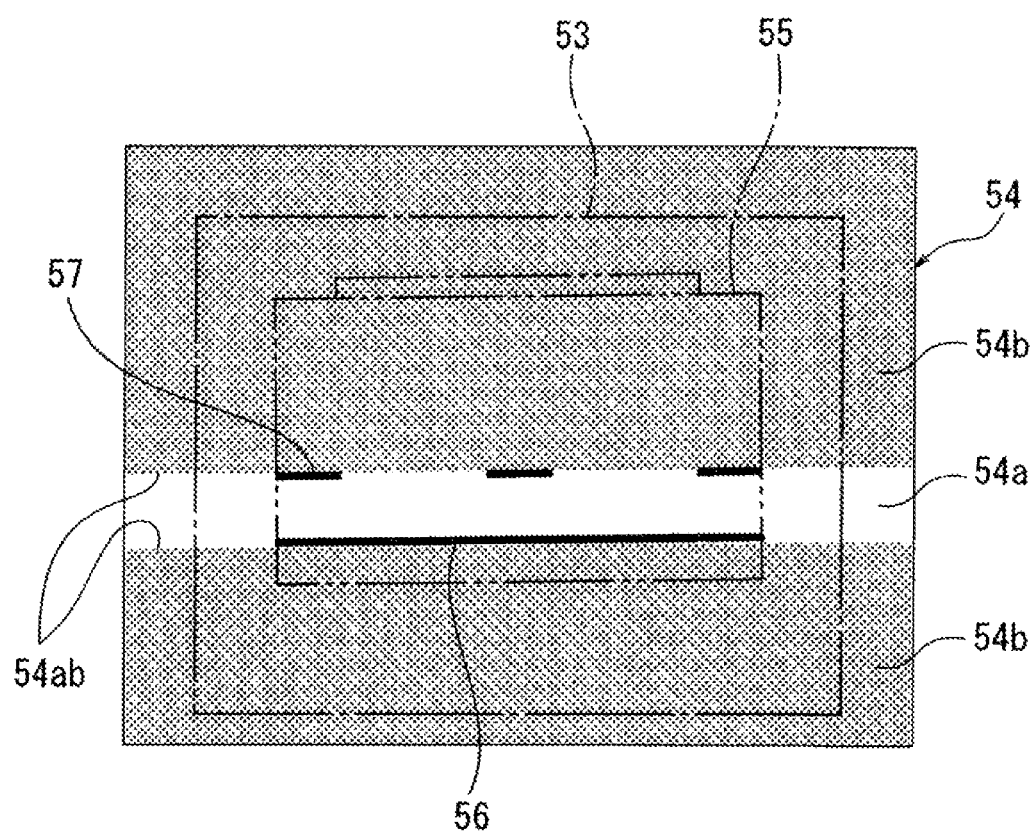

FIG.9B2
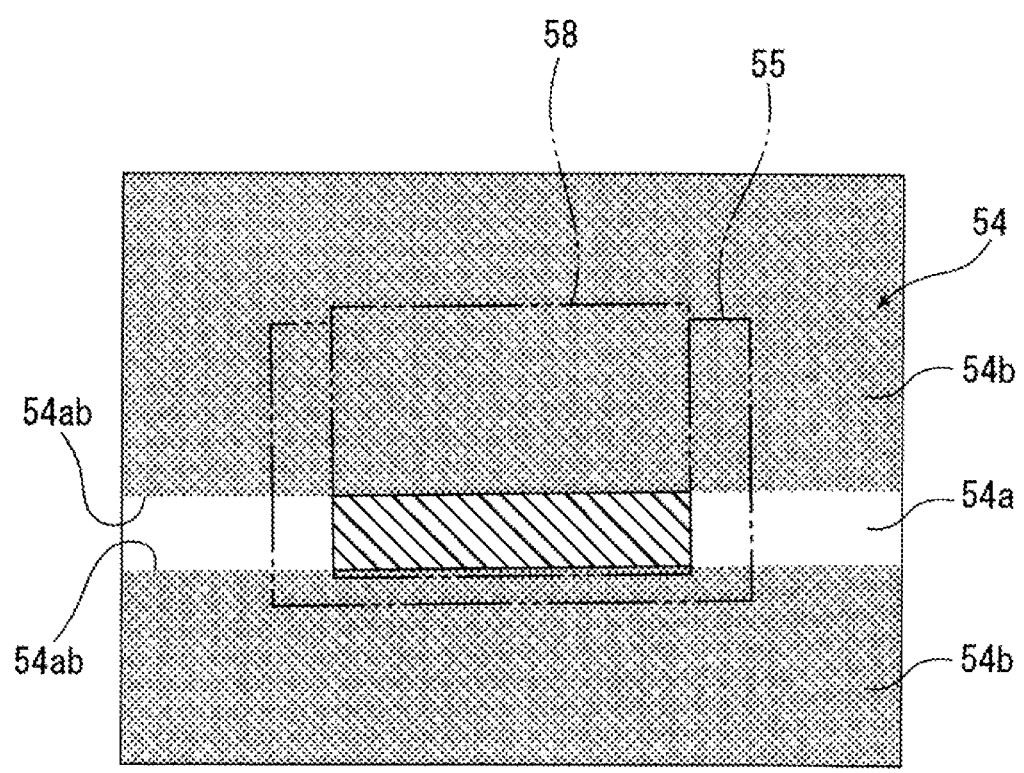

FIG.9C1
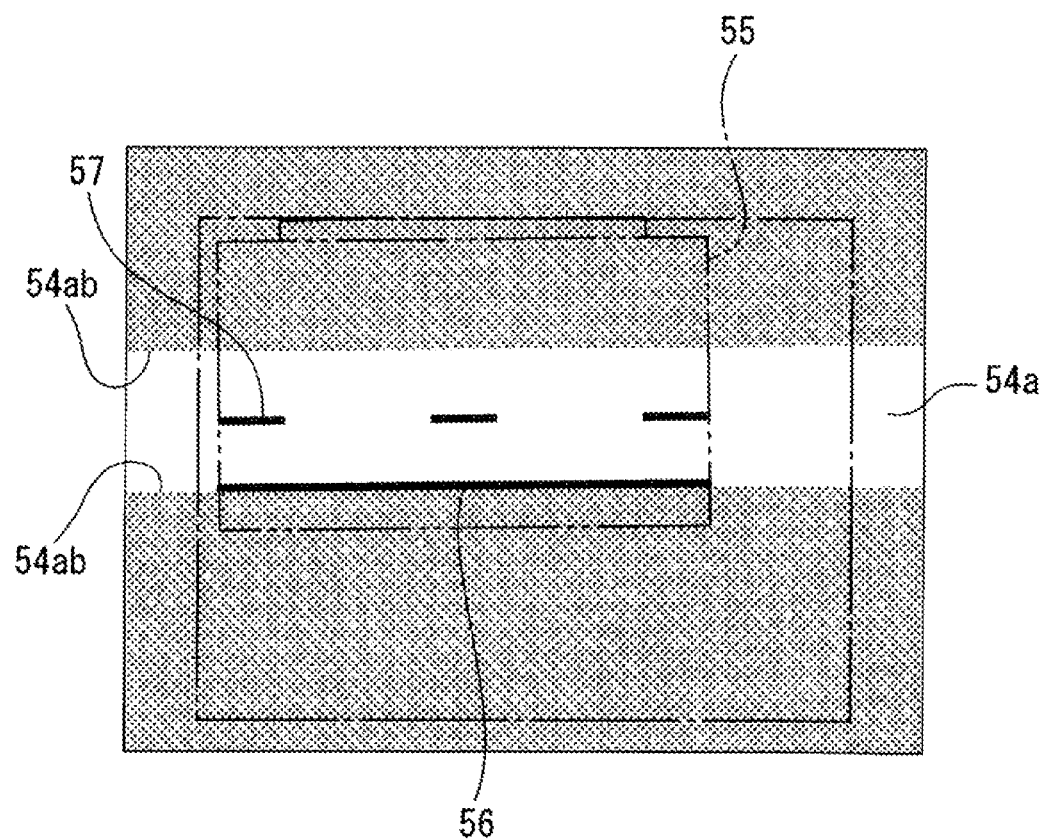

FIG.9C2
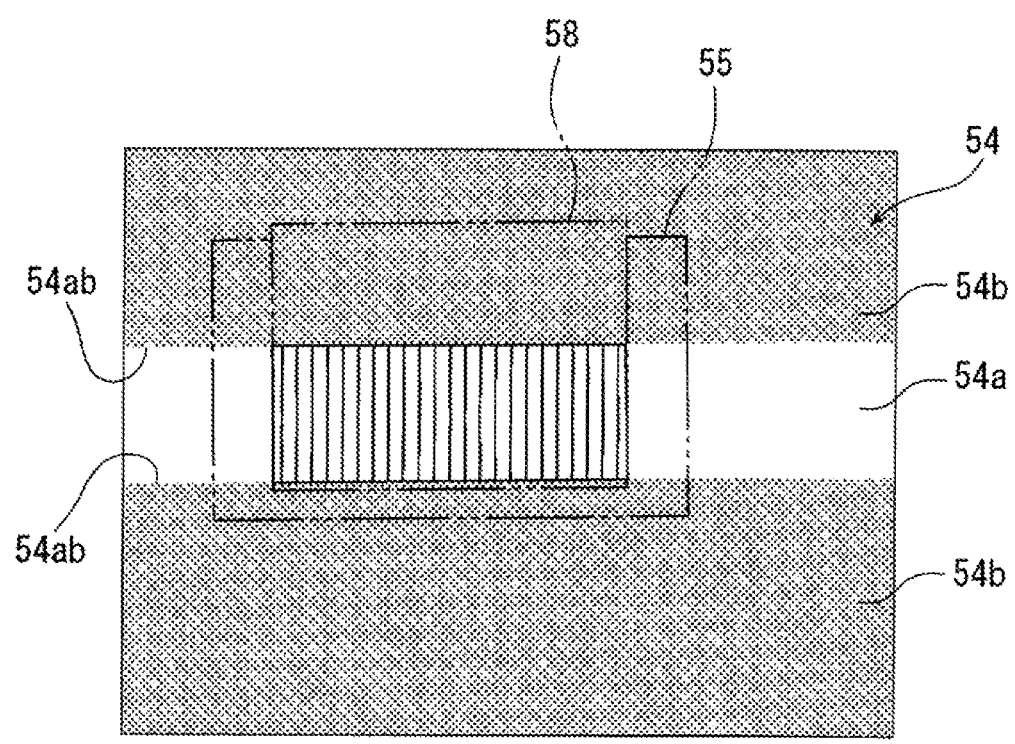

FIG.9D1
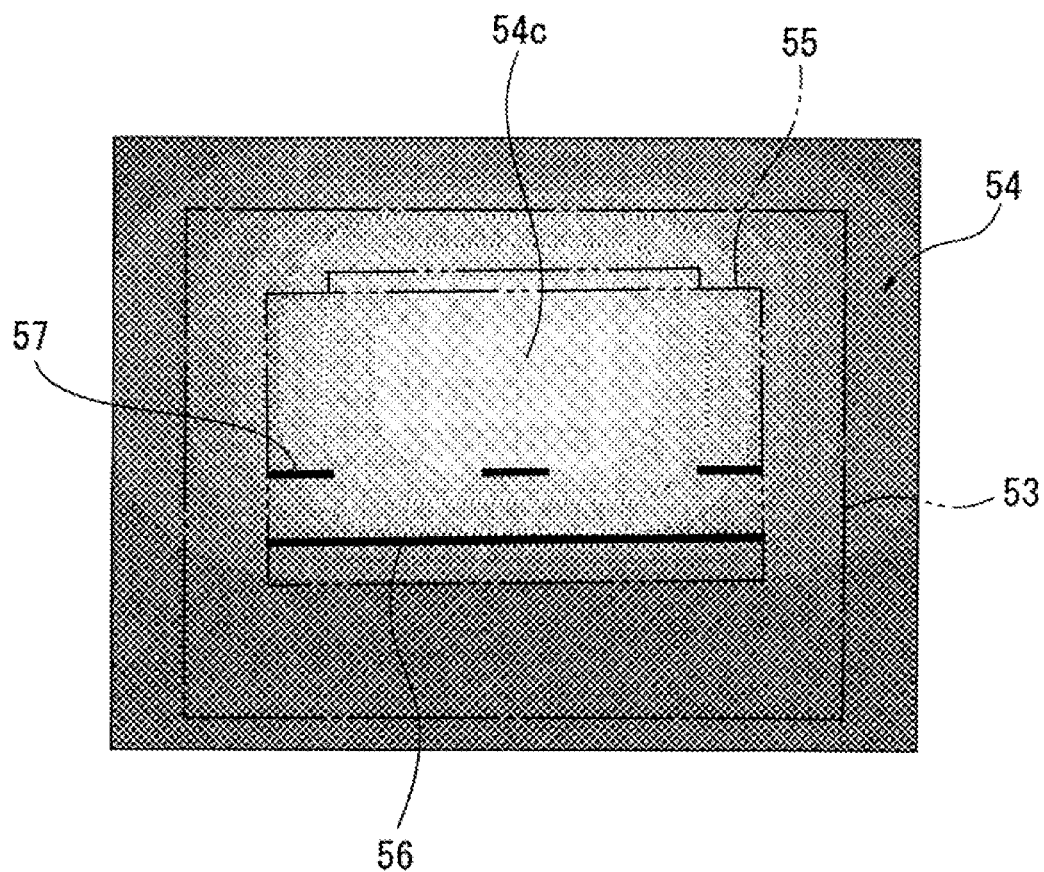

FIG.9D2
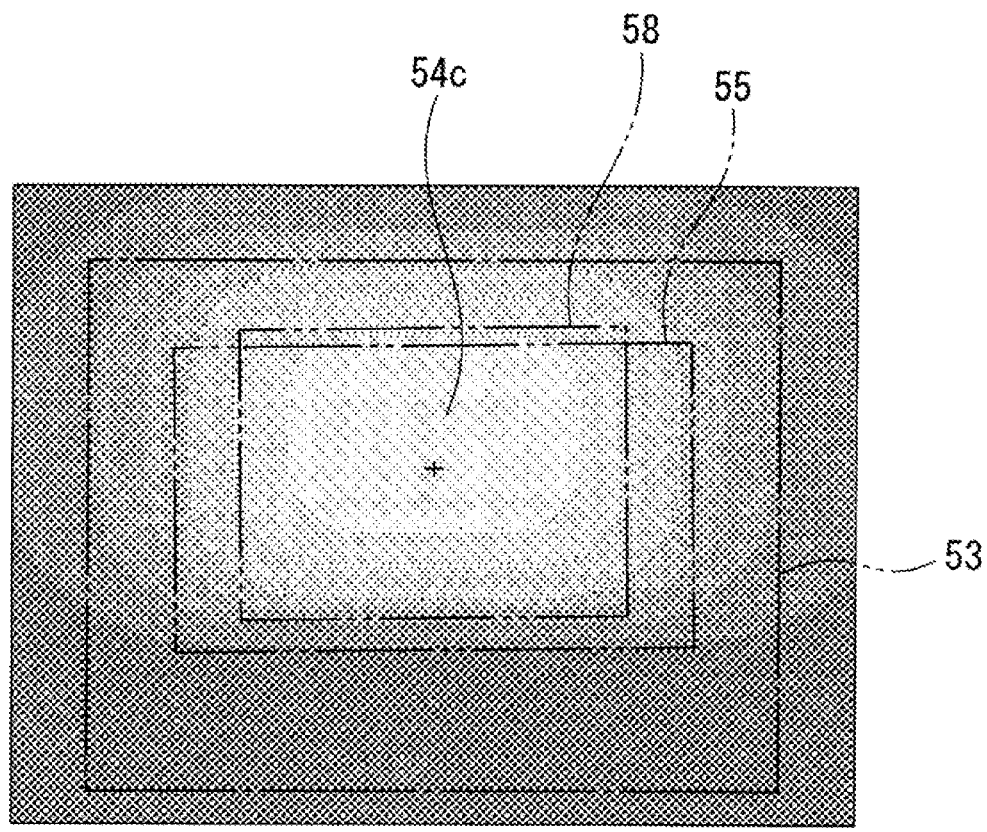

FIG.10B1
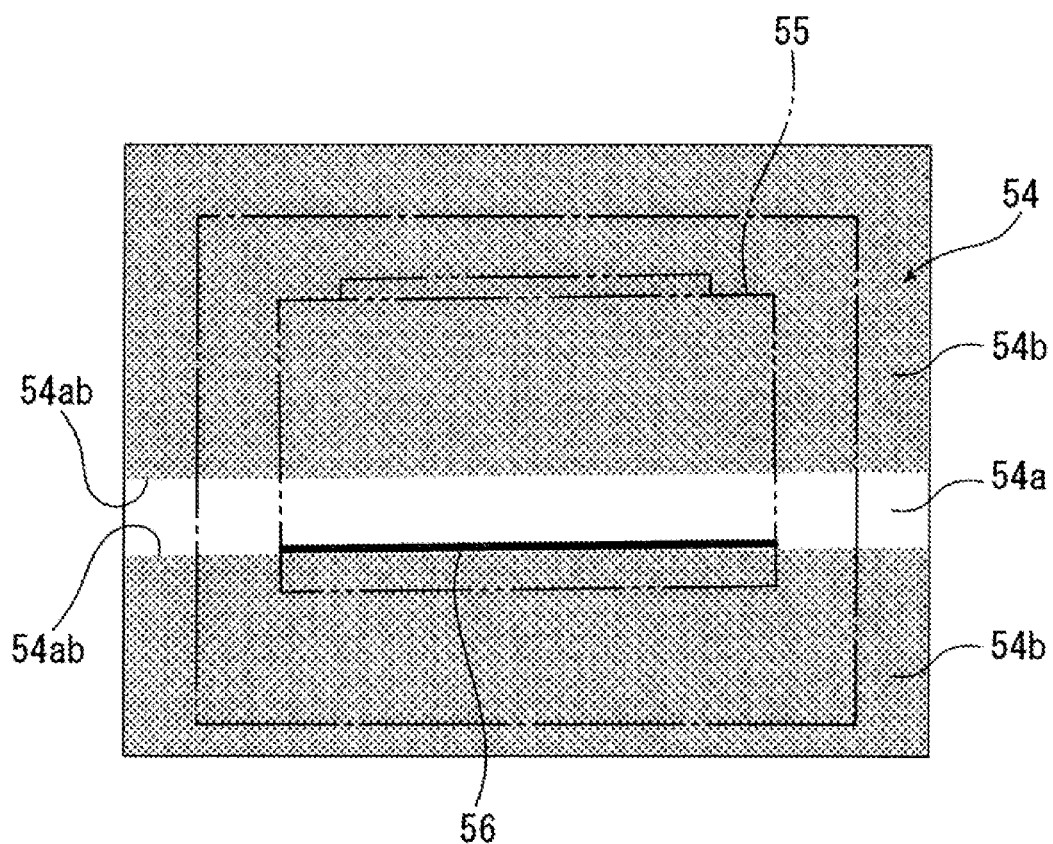

FIG.10B2
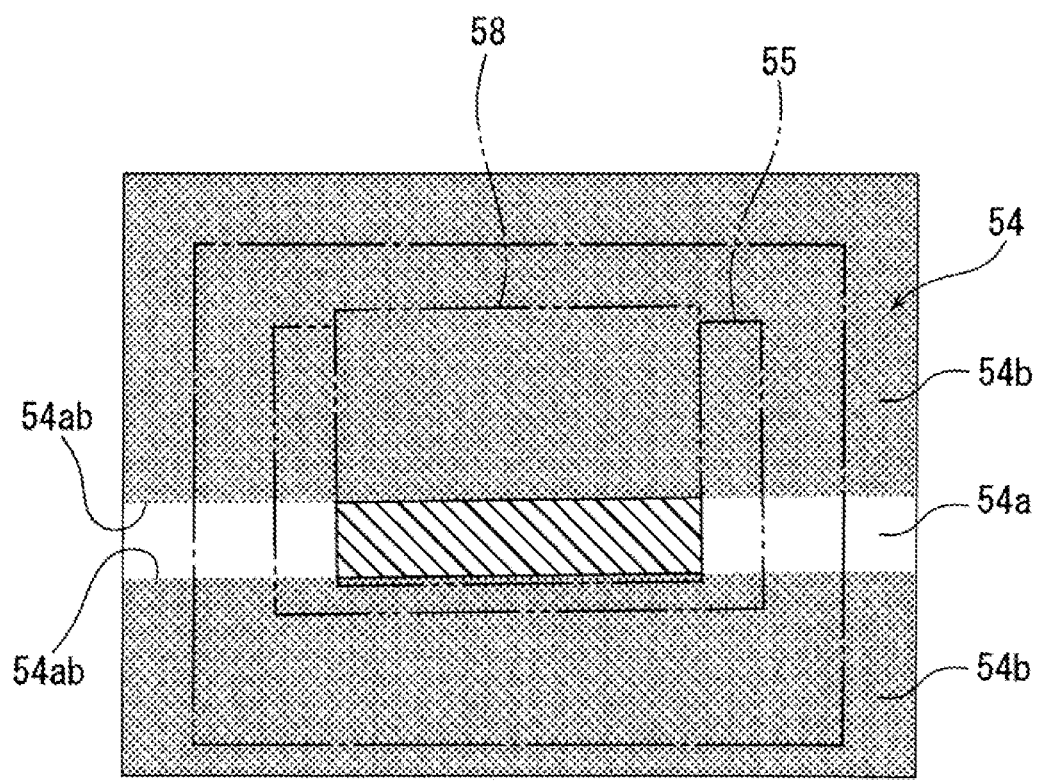

FIG.10C1
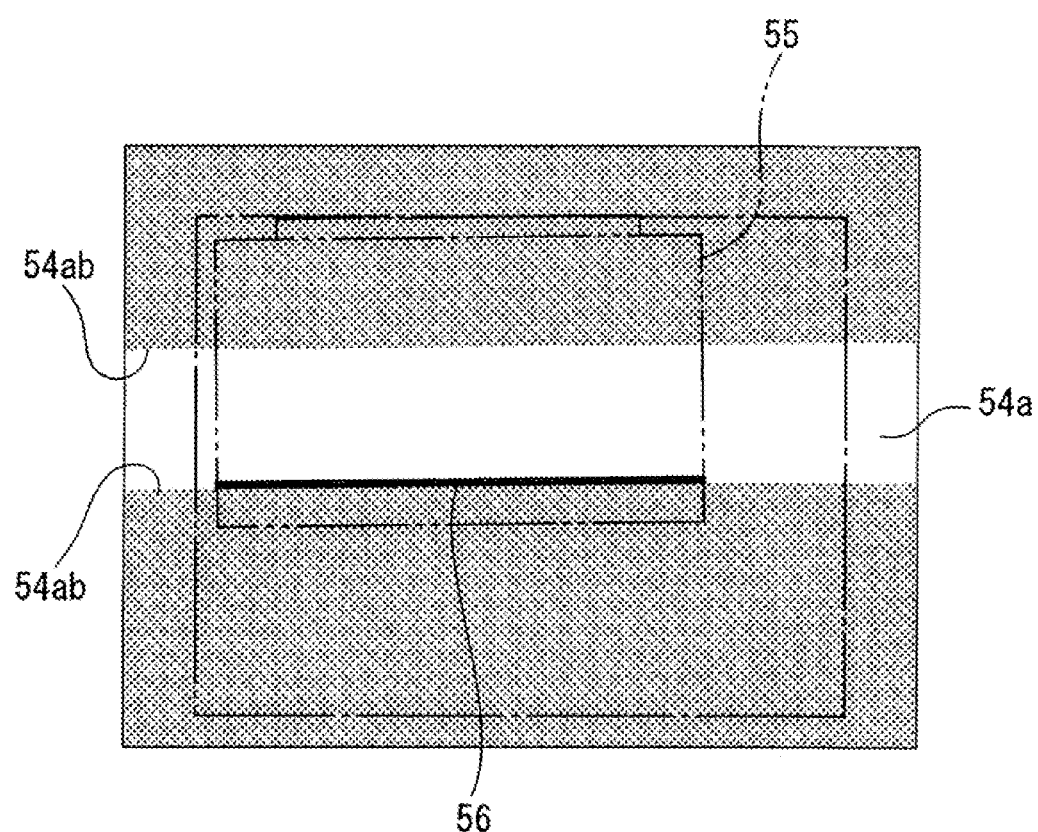

FIG.10C2
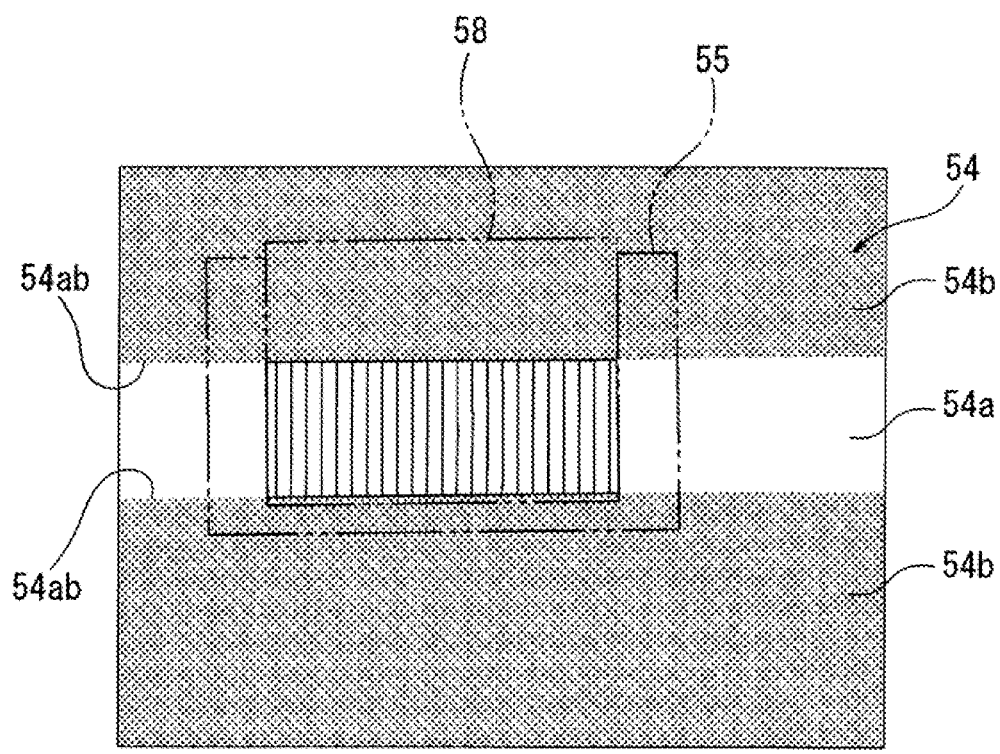

FIG.10D1
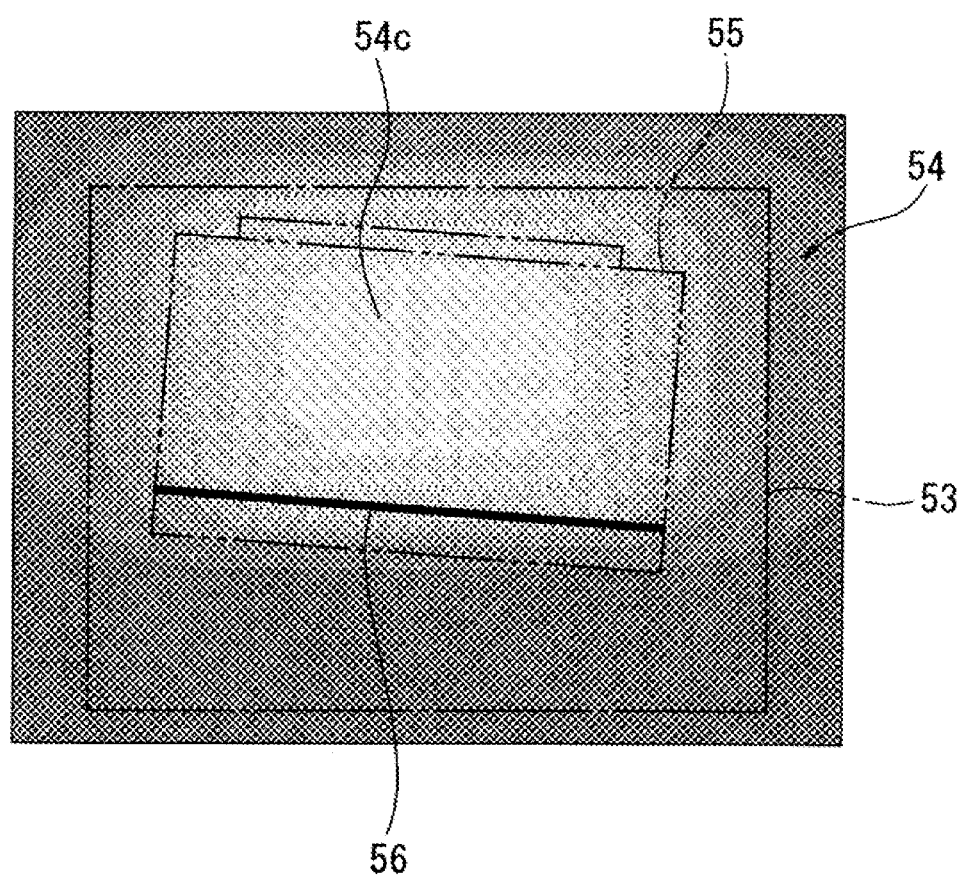

FIG.10D2
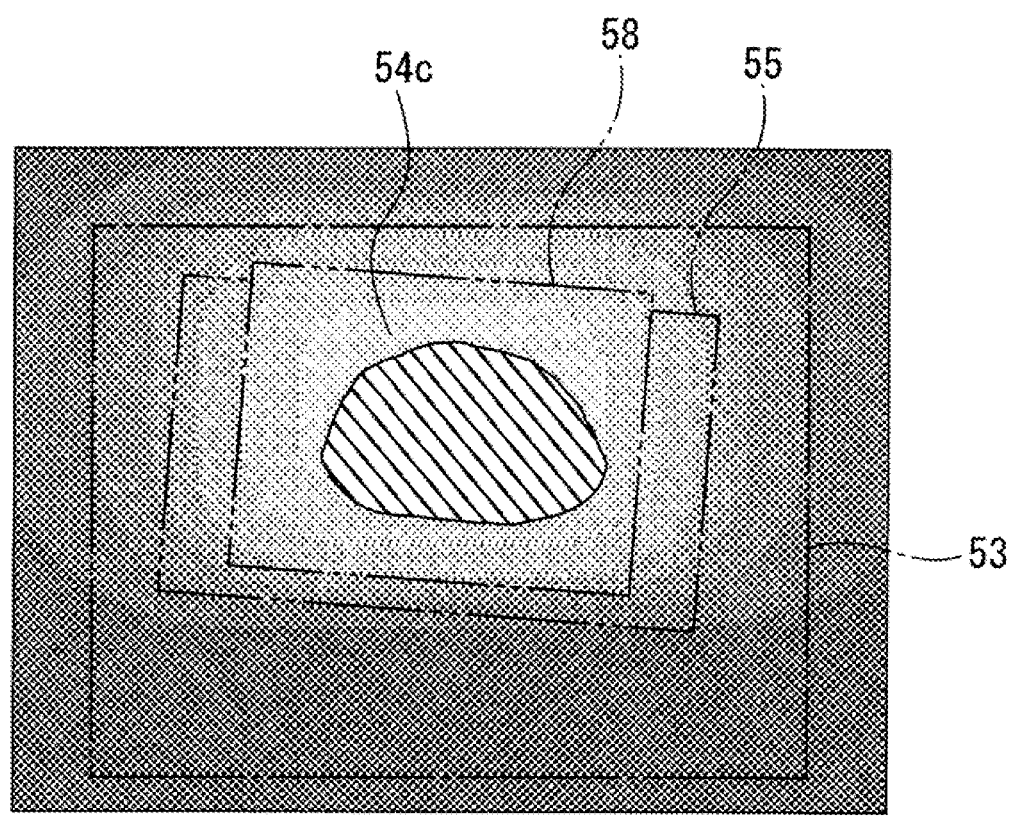

FIG.11B1
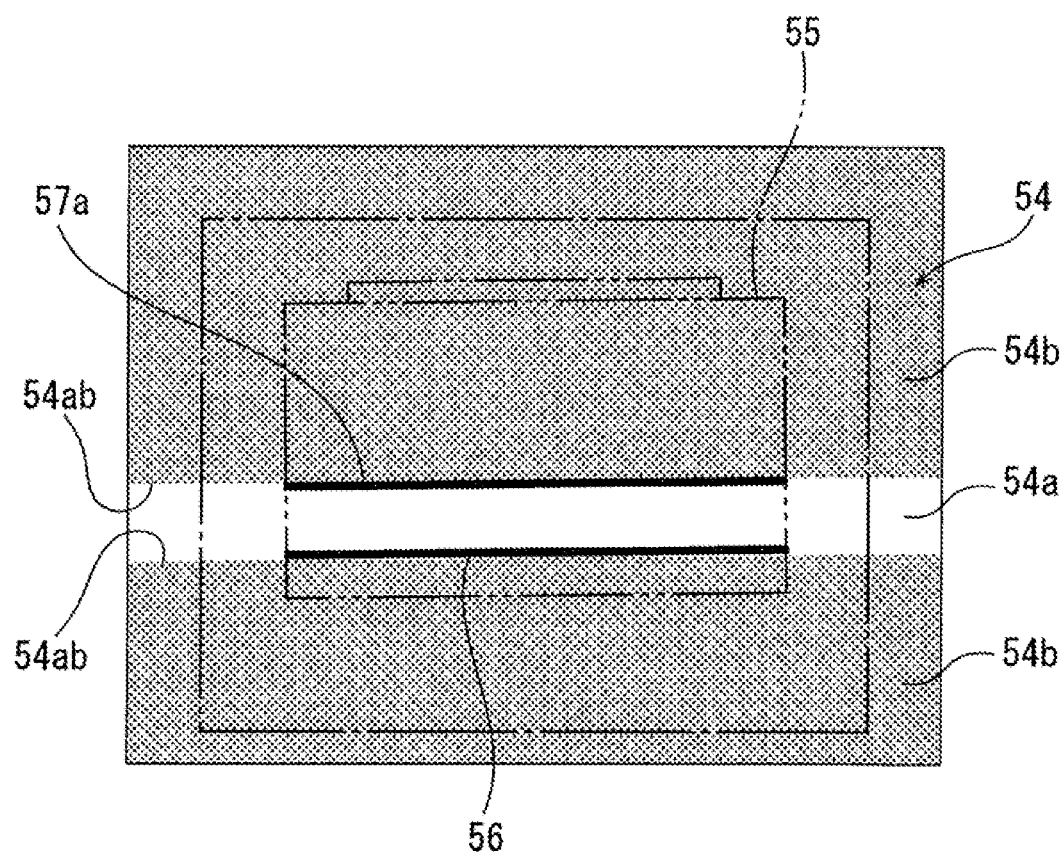

FIG.11B2
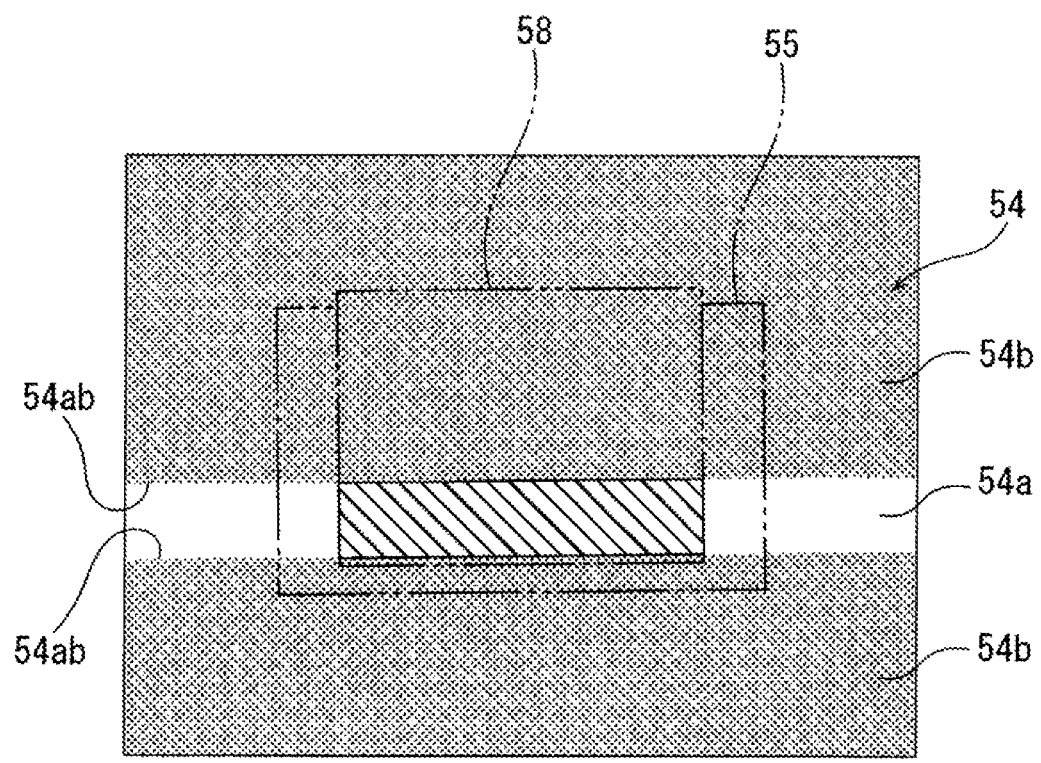

FIG.11C1
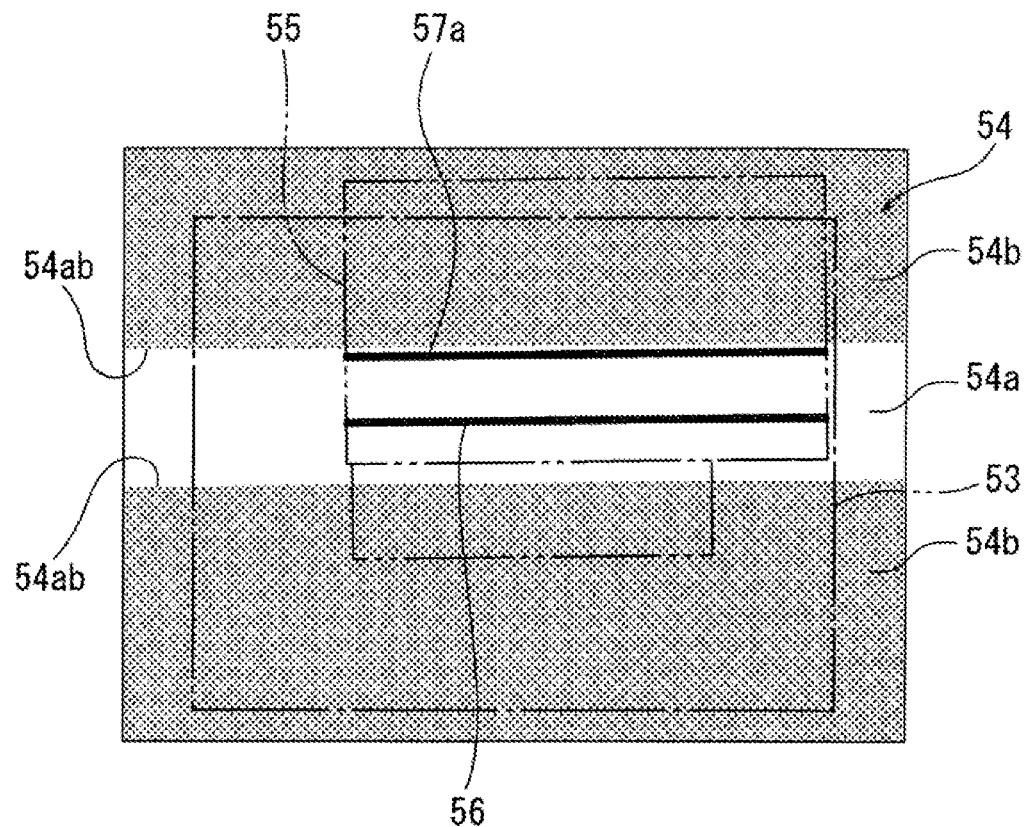

FIG.11D1
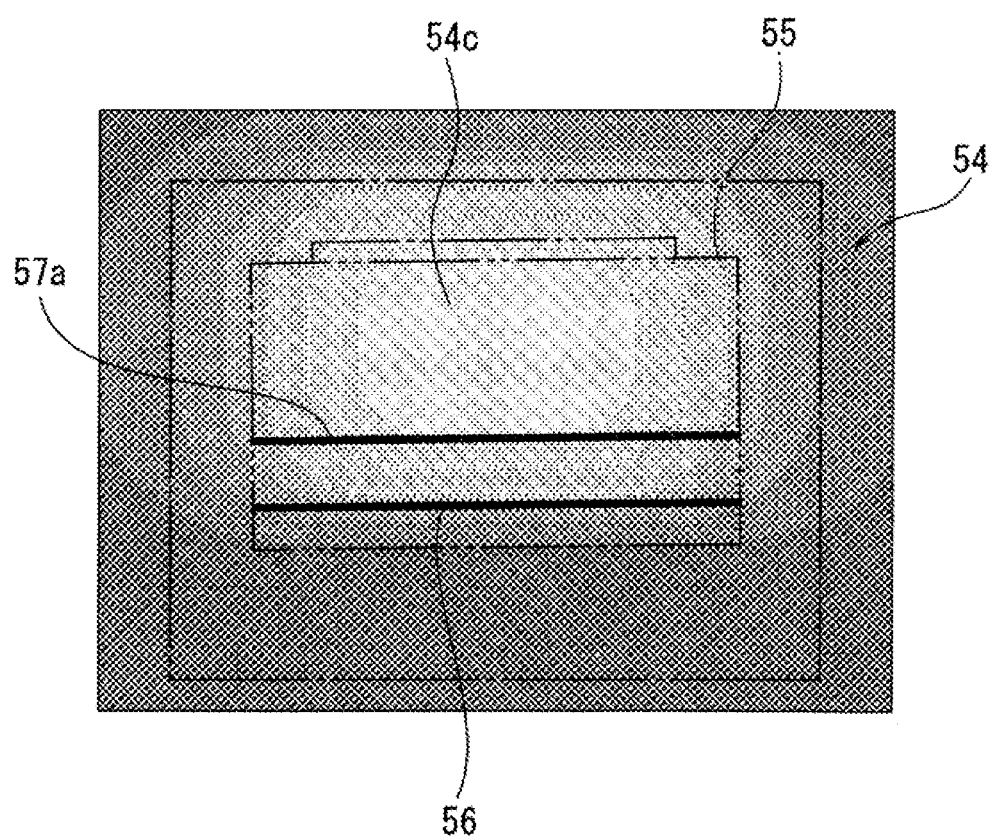

ARRANGEMENT DETECTOR FOR PLATE-SHAPED OBJECT AND LOAD PORT INCLUDING SAME

BACKGROUND OF THE INVENTION

1. Field of the Invention

The invention relates to an arrangement detector for a plate-shaped object and a load port including the same.

2. Description of the Related Art

In a semiconductor factory or the like, substrates, such as silicon wafers, are transported and stored in the factory by using containers in which the substrates are stored. In the field of semiconductor manufacturing device, what is called "a mini-environment method", a local cleaning method, has been generally applied, and it is thus possible to keep the interior of the containers with high cleanliness.

In the mini-environment method, an interface between the container and the semiconductor manufacturing device is usually referred to as a load port, which is widely known. Generally, the load port is provided with a mapping sensor, and it is possible to recognize storage states, such as an inclination, an double-layer, a stepped arrangement, etc., of the substrate with this mapping sensor.

For example, a transmission type sensor is used as the mapping sensor (See the below-described Patent Document 1). In this case, the mapping sensor is attached to a tip of a mapping device (a mapping arm, a mapping frame, etc.) that can move forward and backward and move up and down in a vertical direction with an optical axis oriented in a horizontal direction. The mapping sensor is possible to recognize the storage states of the substrate in the container by advancing the mapping device, inserting the mapping sensor into an opening of the container, and moving the mapping sensor downward. In this respect, when the shape of the substrate is a circular shape like a general semiconductor wafer, it is possible to secure a sufficient space on the opening side between the outer peripheral surface of the substrate and the inner wall surface of the container, and a set of light emitting units and light receiving units can be arranged in the above space to sandwich the substrate To recognize the storage states of the substrates, according to the conventional mapping sensor described above, it is necessary to appropriately position the mapping device and to arrange a pair of a light emitting unit and a light receiving unit to sandwich the substrates as in the below described Patent Document 1.

However, the above mentioned space between the outer peripheral surface of the substrate and the inner wall surface of the container will not be generated when the shape of the substrate is an angled shape such as a square shape or a rectangular shape. Thus, it is difficult to arrange the pair of the light emitting unit and the light receiving unit to sandwich the substrates. Further, although it may be possible to form the above mentioned space by increasing the size of the container, it is not preferable because it causes the increase in sizes of load port or the container transport system.

Therefore, it has been recently proposed to recognize storage states, such as an inclination, an double-layer structure, a stepped arrangement, etc., of the substrates by using an imaging sensor like a surface photoelectric sensor, a CCD camera. The wafer mapping inside the container using this type of imaging sensor detects the states of the substrate (whether it is an abnormal state such as the inclination state, the two-layer state, or a stepped arrangement state, etc.) mainly by discriminating between light and dark.

In principle, the image sensor needs to detect an image in a state where the brightness is increased by using a light source. Since the light emitted from the light source is diffusely reflected inside the container, "blurring" of a spotted light may be generated by the diffused reflection depending on an area of acquiring images. And this "blurring" may cause false detection in the discrimination between light and dark. "Bright" state is determined as "the substrate exists". Thus, the blurring part detected as the "bright" state may be misidentified and determined as "the substrate exists".

[Patent Document 1] Japanese Unexamined Patent Application 2002-164411

SUMMARY OF THE INVENTION

The invention has been made in consideration of such situations. An object of the invention is to provide an arrangement detector for plate-shaped objects, which is less likely to misidentify "blurring" of light as the plate-shaped object such as a substrate, and a lord port using the detector.

To achieve the above object, an arrangement detector for plate-shaped objects according to the invention includes;

- an imaging means, relatively movable in a substantially perpendicular direction to a plane of the plate-shaped objects, and capable of imaging at least a part of one of the plate-shaped objects along an edge of the one of the plate-shaped objects in an imaging screen, with respect to the plate-shaped objects arranged at predetermined intervals in a container,
- a judgement window setting means for setting a first reference line and a second reference line in a judgement window along a pair of substantially parallel image shading boundary lines, with a width corresponding to a thickness of an edge of a single plate-shaped object, based on a master image corresponding to the edge,
- a shape determination means for determining a shape matching rate by superimposing the judgement window, set by the judgement window setting means, on the image captured by the imaging means, and
- an object judgement means for judging the plate-shaped objects do not exist in the judgement window overlaid on the image captured by the imaging means, in case that the shape matching rate determined by the shape determination means is equal to or less than a predetermined value, in which
- the first reference line is a continuous straight line in the judgement window, and the second reference line is a collection of discontinuous line segments linearly arranged in the judgement window.

In case when judging only by the first reference line of the continuous straight lines, it is difficult to determine whether it coincides with the first reference line due to a light blurring in the image or due to the bright part of the normal plate-shaped objects. Therefore, there is a high possibility that the light blurring in the image is misidentified as a normal plate-shaped objects.

In case when determined by the first reference line of the continuous straight line and the second reference line of the same, the light blurring in the imaging screen decreases the matching rate with the first reference line of the continuous straight line and second reference lines of the same, and there is less possibility to mistakenly judge the light blurring in the image screen as a normal plate-shaped object. However, in this case, there is a high possibility that the state in which overlaid two plate-shaped objects are mistakenly judged as not a normal plate-shaped object, similar to the light blurring in the image screen.

According to the arrangement detector for the plate-shaped objects, the first reference line is a continuous straight line in the judgement window, and the second reference line is a collection of discontinuous line segments linearly arranged in the judgement window. Therefore, it reduces the matching ratio between a combination of the first reference line of a continuous straight line and the second reference line of discontinuous dotted lines. There is little risk of misidentifying the light blurring as a normal plate-shaped object. Further, when two plate-shaped objects are overlaid, the matching rate between the combination of the first reference line of a continuous straight line and the second reference line of discontinuous dotted lines is higher than the light blurring. Thus, it can be distinguished from the light blurring and there is little risk of misidentifying with the light blurring.

Preferably, the arrangement detector for the plate-shaped objects preferably further includes an area calculation means for searching a pair of substantially parallel image shading boundary lines based on an actual image captured by the imaging means in the judgement window, in case that the object judgement means judges that the plate-shaped objects exist.

In case when the object judgement means judges that the plate-shaped objects exist, the area calculation means searches for a pair of substantially parallel image shading boundary lines, and calculates an area or width of the bright region in the image screen. By calculating the area or width of the bright region, it is possible to judge whether it is a single plate-shaped object or a double-layered plate-shaped object.

Preferably, the area calculation means calculates an area between a pair of image shading boundary lines within a predetermined length along the pair of image shading boundary lines in the judgement window and judges that a single plate-shaped object is in the area, in case that a pair of substantially parallel image shading boundary lines based on the actual image is observed, and the area obtained by the calculation is within a predetermined normal range.

Preferably, the area calculation means calculates an area between the pair of image shading boundary lines within a predetermined length along the pair of image shading boundary lines in the judgement window and judges that two plate-shaped objects are in the area, in case that a pair of substantially parallel image shading boundary lines based on the actual image is observed, and the area obtained by the calculation is within a predetermined a double-layer overlaying range. That is, the area calculation means judges that it is a single plate-shaped object, in case the area obtained by calculation is within an area corresponding to a single plate-like object. And, the area calculation means easily judges that it is a two plate-shaped object, in case the area obtained by calculation is within an area corresponding to a sum of double-layer.

Preferably, a length of a gap between discontinuous line segments of the second reference line is greater than a length of each segment. With such a configuration, it is possible to easily distinguish the double-layer and the light blurring, and there is little possibility that the double-layer is mistaken as the light blurring.

A load port of the invention includes the arrangement detector for the plate-shaped objects.

BRIEF DESCRIPTION OF THE DRAWINGS

FIG. 9B1 is a schematic view showing an example of the judgement window to be superimposed and displayed on the actual imaging screen capturing one substrate by the mapping sensor shown in FIG. 5A.

FIG. 9B2 is a schematic view showing a calculation state of the bright region area in the judgement window in the imaging screen shown in FIG. 9B1.

FIG. 9C1 is a schematic view showing an example of the judgement window to be superimposed and displayed on the actual imaging screen capturing double-layer substrates by the mapping sensor shown in FIG. 5A.

FIG. 9C2 is a schematic view showing a calculation state of the bright region area in the judgement window in the imaging screen shown in FIG. 9C1.

FIG. 9D1 is a schematic view showing an example in which the judgement window is superimposed and displayed on an actual imaging screen in which the light blurring is captured by the mapping sensor shown in FIG. 5A.

FIG. 9D2 is a schematic view showing a calculation state of the bright region area in the judgement window in the image screen shown in FIG. 9D1.

FIG. 10B1 is a schematic view showing an example of the judgement window to be superimposed and displayed on the actual imaging screen capturing one substrate by the mapping sensor according to Comp. Ex. 1 of the invention.

FIG. 10B2 is a schematic view showing a calculation state of the area of the bright region in the judgement window in the imaging screen shown in FIG. 10B1.

FIG. 10C1 is a schematic view showing an example in which a judgement window is superimposed and displayed on an actual imaging screen in which double-layered substrates are imaged by the mapping sensor according to Comp. Ex. 1.

FIG. 10C2 is a schematic view showing a calculation state of the area of the bright region in the judgement window in the imaging screen shown in FIG. 10C1.

FIG. 10D1 is a schematic view showing an example in which a judgement window is superimposed and displayed on an actual imaging screen, in which the light blurring is captured by the mapping sensor according to Comp. Ex. 1.

FIG. 10D2 is a schematic view showing a calculation state of the bright region area in the judgement window in the imaging screen shown in FIG. 10D1.

FIG. 11B1 is a schematic view showing an example of the judgement window to be superimposed and displayed on the actual imaging screen capturing one substrate by the mapping sensor according to Comp. Ex. 2 of the invention.

FIG. 11B2 is a schematic view showing a calculation state of the area of the bright region in the judgement window in the imaging screen shown in FIG. 11B1.

FIG. 11B2 is a schematic view showing a calculation state of the bright region area in the judgement window in the imaging screen shown in FIG. 10B1.

FIG. 11C1 is a schematic view showing an example in which a judgement window is superimposed and displayed on an actual imaging screen in which double-layered substrates are imaged by the mapping sensor according to Comp. Ex. 2.

FIG. 11D1 is a schematic view showing an example in which a judgement window is superimposed and displayed on an actual imaging screen, in which the light blurring is captured by the mapping sensor according to Comp. Ex. 2.

DESCRIPTION OF THE EMBODIMENTS

Figure 1A:
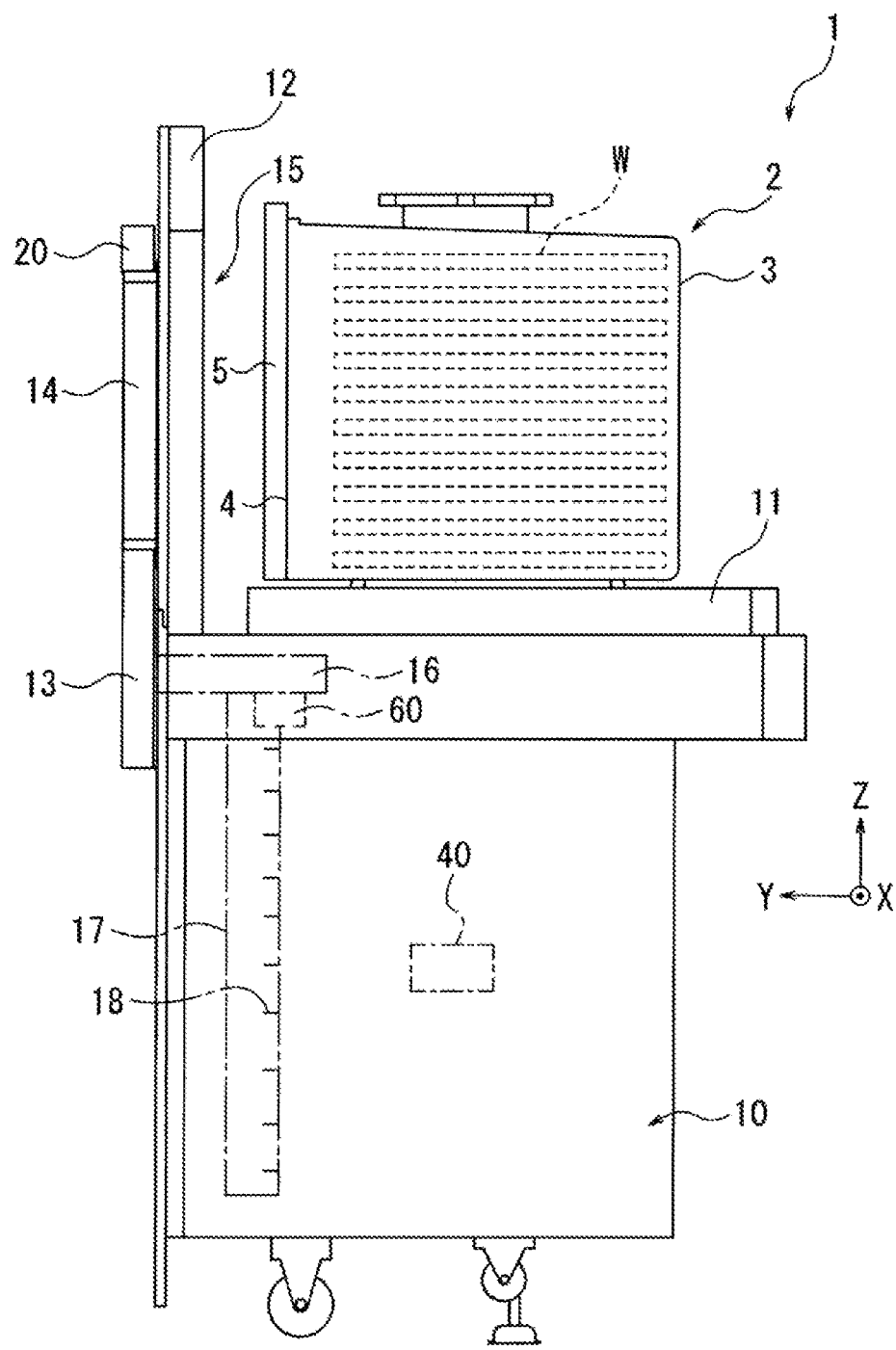
FIG. 1A is a schematic side view showing the load port according to an embodiment of the invention and the container mounted on the load port.

Hereinafter, the invention will be described based on the embodiments shown in the drawings.

Figure 1B:
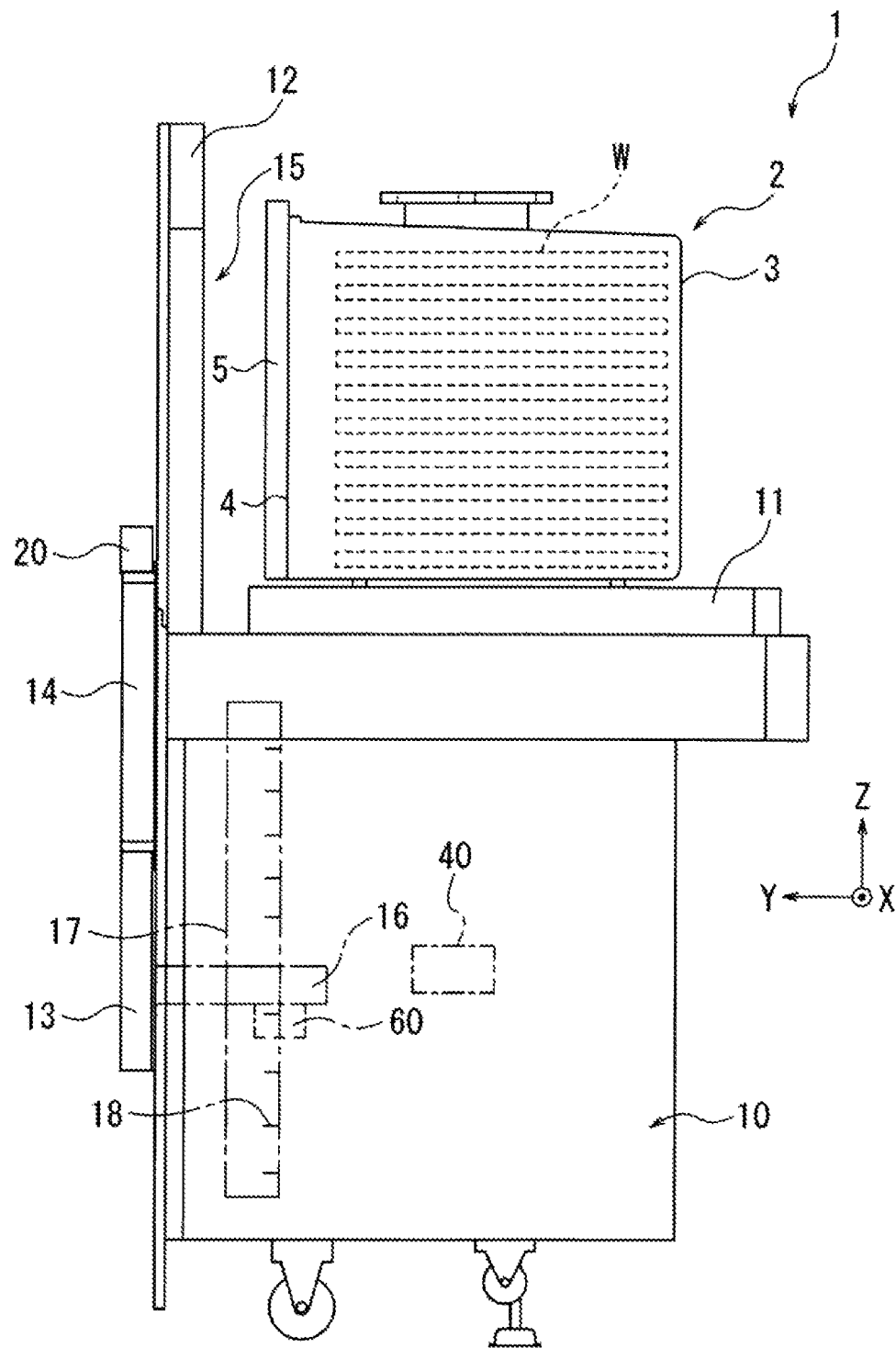
FIG. 1B is a side view of the load port when the door of the load port shown in FIG. 1A is moved downward, and the container mounted on the load port.

The load port 1 shown in FIGS. 1A and 1B serve as an interface between a container (storage container) 2 for accommodating a plurality of semiconductor wafer W and a semiconductor manufacturing device (not shown), and is a part of an EFEM. EFEM forms a mini-environment where a robot arm for a wafer transport or like is provided. The robot arm takes out a semiconductor wafer W stored in the container 2, which is connected to the mini-environment by the load port 1, and transports the semiconductor wafer W to a semiconductor processing device. An example of the container 2 includes FOUP (Front-Opening Unified Pod).

The load port 1 includes a control box 10, a movable table 11, a frame 12, a support frame 13, a door 14, a drive 16, a rod 17, a sensor dog 18, a mapping sensor 20, etc. The control box 10 includes the drive 16 for operating the door 14, a control unit 40 for controlling various operations by the mapping sensor 20, etc.

The movable table 11 internally accommodates the substrate W, such as a semiconductor wafer, a display substrate or other substrate, as the plate-shaped object. The container 2 for storing and transporting the substrate W is detachably placed on the movable table 11. The movable table 11 has such as a moving table movable in the Y-axis direction with the container 2 mounted on the upper part, and the storage port 4 of the container 2 can be connected to an opening 15 of the frame 12. In the drawings, the Y-axis indicates the moving direction, the front-back direction, of the movable table 11, the Z-axis indicates the vertical direction, and the X-axis, the Y-axis, and the Z-axis are perpendicular to each other.

Figure 4:
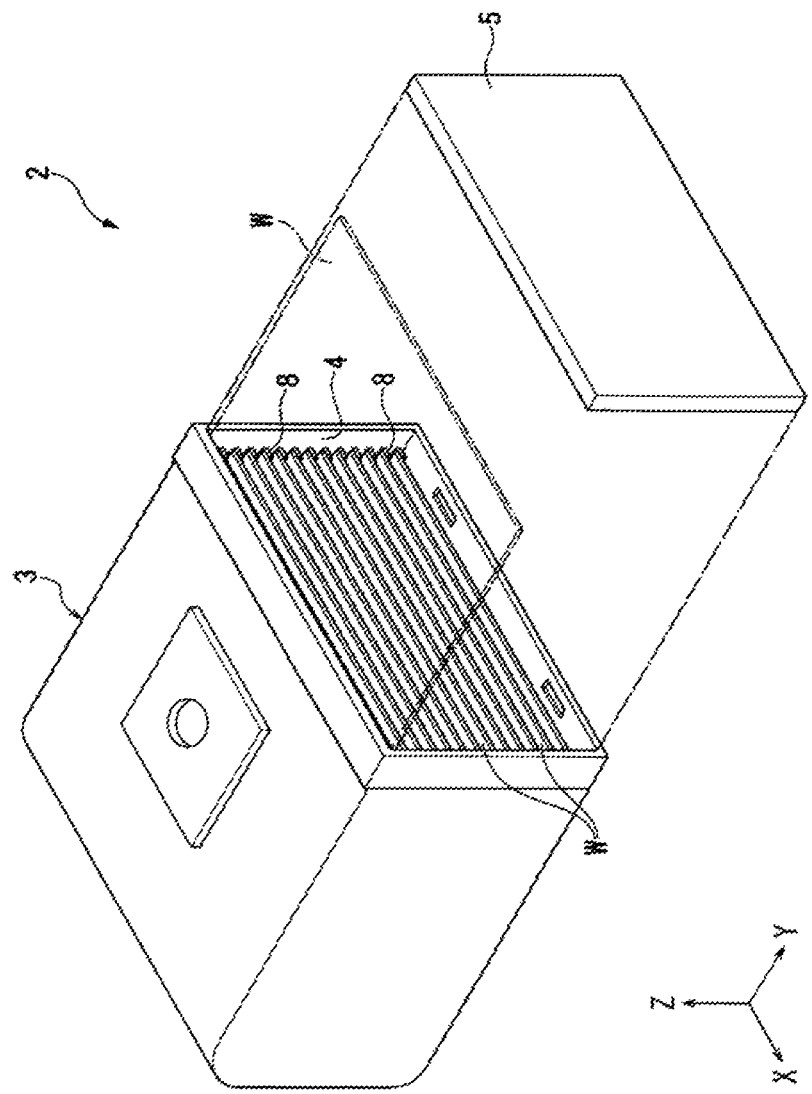
FIG. 4 is a schematic perspective view of the container shown in FIG. 1A.

The container 2 will be briefly described. As shown in FIG. 4, inside a container body 3, a plurality of storage shelves 8 extend in the front-rear direction along the Y-axis facing each other along the X-axis, and form multiple steps at regular intervals along the Z-axis. The substrate W is stored by utilizing the plurality of storage shelves 8. As a result, the substrates W are stored in the container 2, vertically arranging multiple steps. In the embodiment, the substrate W having the angled shape will be described as an example, but the shape of the substrate W is not limited thereto, and may be formed in such as a circular shape.

As shown in FIG. 1A, the frame 12 extends upward from the movable table 11, and the movable table 11 and the container 2 mounted on the movable table 11 approach and depart from the frame 12 in the forward and backward direction. An opening 15 is formed in the frame 12 to face the storage port 4 of the container 2, and the opening 15 is opened and closed by the door 14. The frame 12 makes it possible to partition a processing chamber of the semiconductor manufacturing device from an external space located outside the semiconductor manufacturing device.

The door 14 can open and close the opening 15, and engage with a lid 5 detachably provided in the storage port 4 of the container 2 to open and close the storage port 4. At the load port 1, after the movable table 11 moves the container 2 forward to a position where it contacts the frame 12, the door 14 engages with the lid 5 of the container 2 and is pulled into the mini-environment. Thus, the inside of the container 2 and the mini-environment can be connected via the storage port 4 of the container 2.

A support frame 13 is integrally connected to the lower end edge of the door 14. A drive 16 placed in the control box 10 is connected to the support frame 13, and the drive 16 moves downward along the rod 17 extending in the vertical direction, whereby the door 14 is possible to move downward through the support frame 13.

Figure 3:
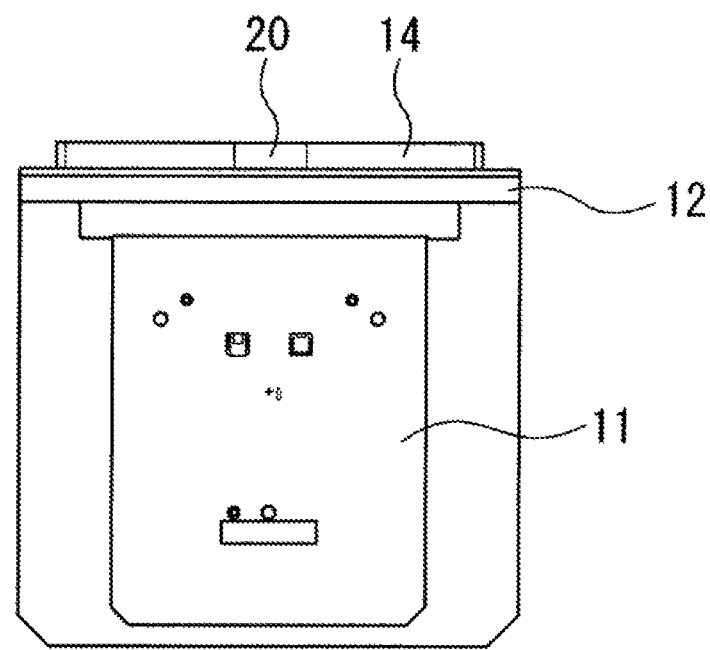
FIG. 3 is a plan view of the load port shown in FIG. 1A.
Figure 3:
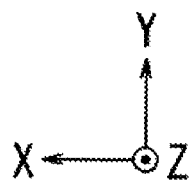

The mapping sensor 20 as an imaging means image the substrate W to detect the state of the substrates W. As shown in FIGS. 1A and 3, the mapping sensor 20 is integrally fixed to the upper end edge of the door 14. Specifically, the mapping sensor 20 is fixed to an upper end edge of the door 14 at a center place in a lateral direction of the door 14 by such as a fastening means (not shown).

The mapping sensor 20 is arranged above the substrate W, located at the uppermost place among the plurality of substrates W stored in the container 2. The mapping sensor 20 may be fixed to the upper end edge of the door 14 in a state where it can be moved in the lateral direction. In this case, the position of the mapping sensor 20 can be adjusted as required.

Figure 5A:
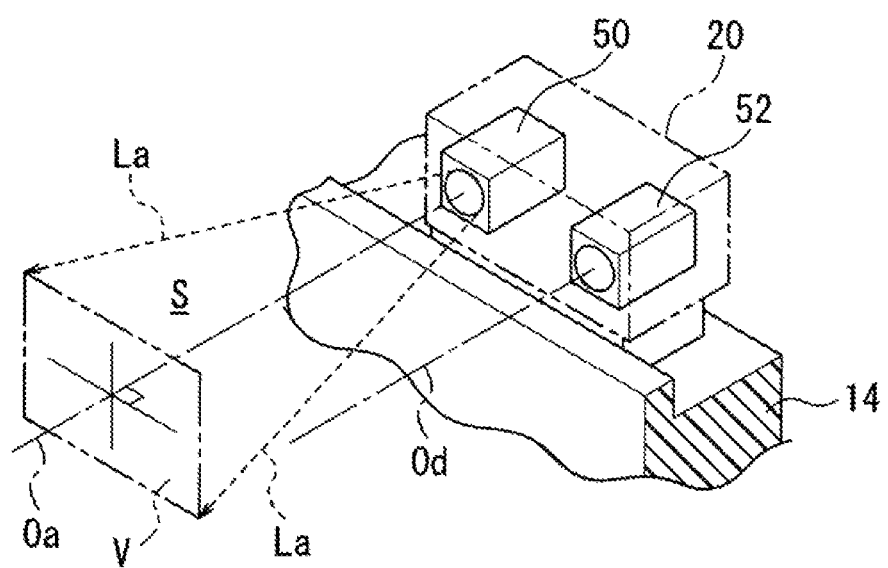
FIG. 5A is a schematic perspective view of the mapping sensor (the arrangement detector for the plate-shaped objects) shown in FIG. 1A.

As shown in FIG. 5A, the mapping sensor 20 includes a light emitting unit 50 that irradiates light La for imaging toward the front to the substrate W side, and an imaging unit 52 that acquires an imaging screen 54 (see FIG. 8) by capturing an image of the light La (inside the illumination area S illuminated by the light emitting unit 50) emitted from the light emitting unit 50. The imaging unit 52 images a virtual imaging surface V that intersects an optical axis Oa of the light La, and acquires, for example, the imaging screen 54 shown in FIG. 8. That is, the mapping sensor 20 shown in FIG. 5A is an image acquisition sensor (or a surface photoelectric sensor) that acquires a two-dimensional imaging screen 54.

Figure 6:
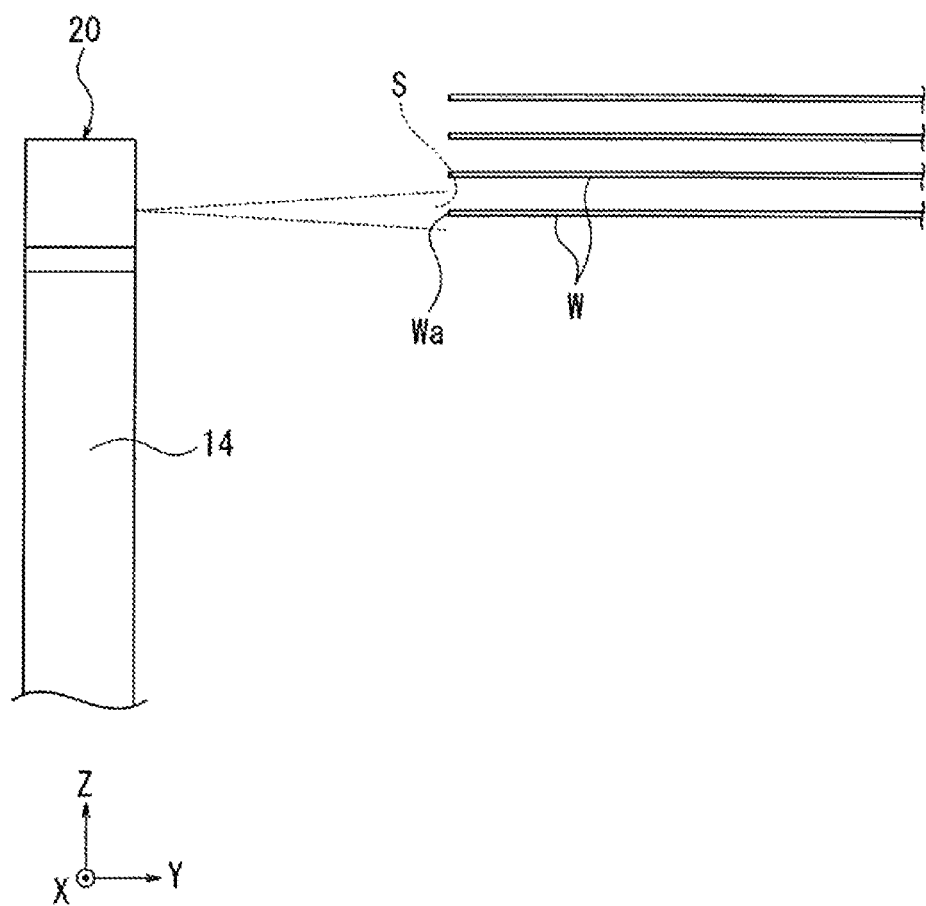
FIG. 6 is a schematic side view showing an example of an imaging range imaged by the mapping sensor shown in FIG. 5A.
Figure 7:
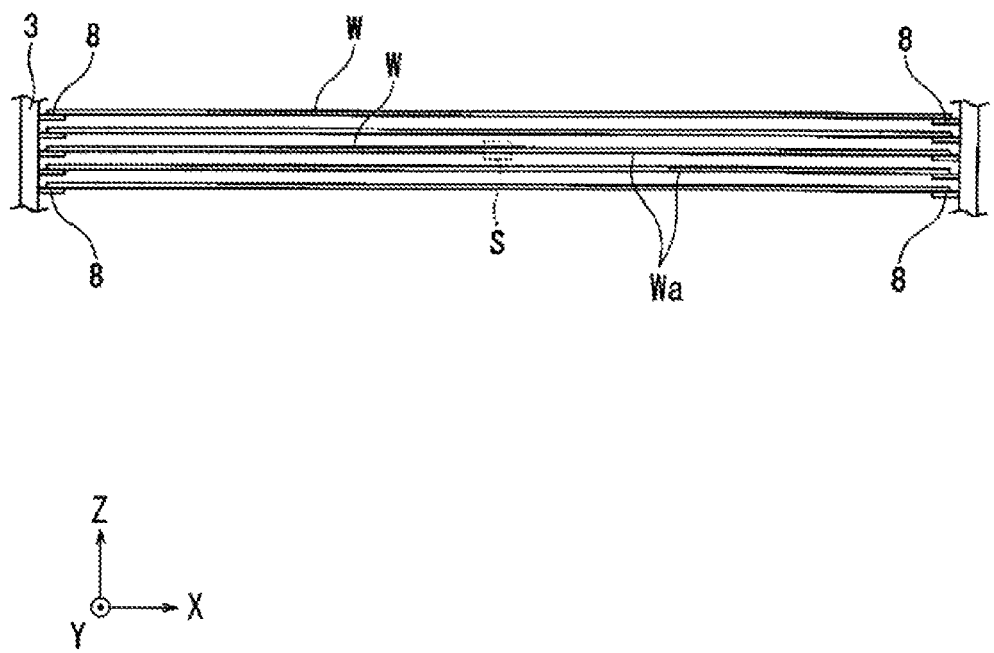
FIG. 7 is a schematic front view showing an example of an imaging range imaged by the mapping sensor shown in FIG. 5A.

The light emitting unit 50 shown in FIG. 5A is such as an LED, and irradiates light La adjusted to a predetermined wavelength band. The light emitting timing of the light emitting unit 50 is controlled by such as the control unit 40 shown in FIG. 1A. Emitting unit 50, as shown in FIGS. 6 and 7, irradiates light La to include one substrate W in the illumination area S by adjusting such as a light emitting angle and an emission intensity. In the embodiment, as shown in FIG. 5A, the imaging axis Od of the imaging unit 52 is substantially parallel to the optical axis Oa of the light emitting unit 50, however, they are not always necessary to be parallel and either of them may be arranged with inclination.

Figure 5B:
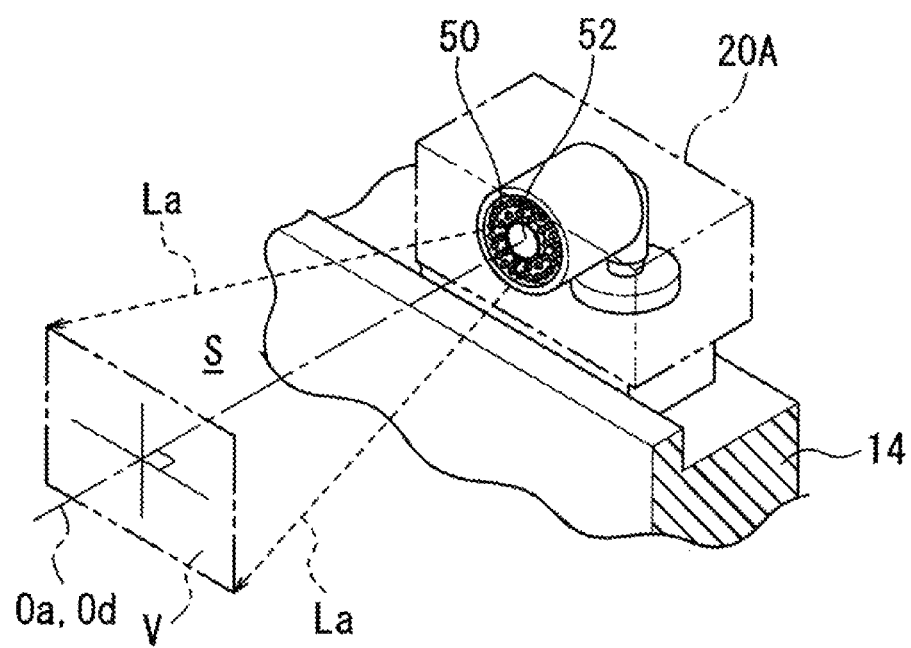
FIG. 5B is a schematic perspective view of the mapping sensor according to another embodiment of the invention.

Further, the light emitting unit 50 and the imaging unit 52 prepared separately are combined to form the mapping sensor 20 in the example shown in FIG. 5A, however, it may be the mapping sensor 20A as shown in FIG. 5B where a plurality of light emitting units 50 is placed around the imaging unit 52. In the mapping sensor 20A shown in FIG. 5B, the imaging axis Od of the imaging unit 52 substantially matches the optical axis Oa of the light emitting unit 50.

The imaging unit 52 includes, for example, a solid-state imaging element such as CMOS, CCD, etc., and acquires such as the image 54 corresponding to the light emission intensity, and outputs the acquired image 54 to the control unit 40. The substrate reflected light, the inner wall surface reflected light, and the like incident on the image unit 52. The imaging timing of the imaging unit 52 is controlled by such as the control unit 40.

Figure 8:
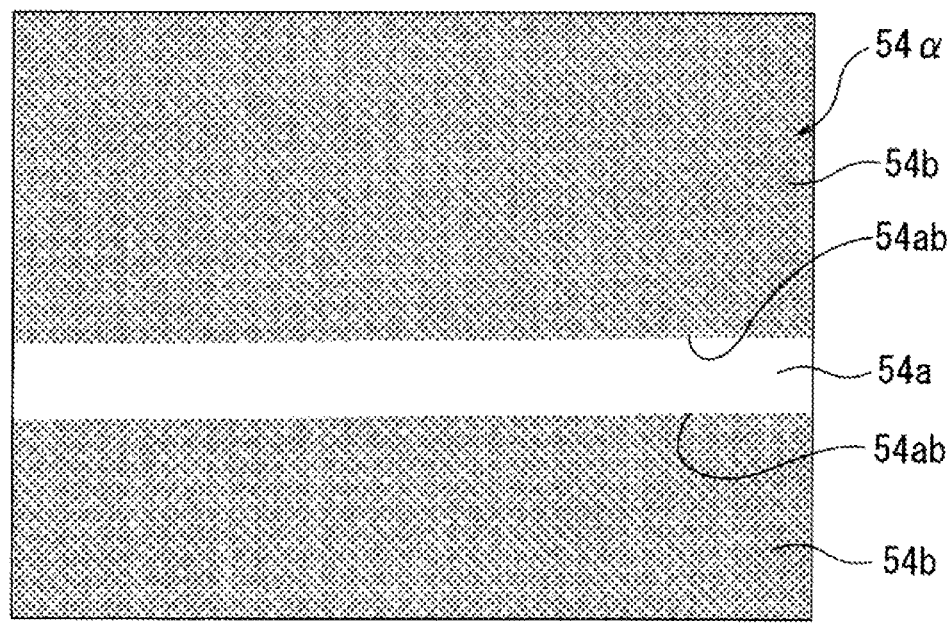
FIG. 8 is a schematic view showing an example of a master image imaged by the mapping sensor shown in FIG. 5A.

As shown in FIGS. 6 and 7, the light emitting unit 50 shown in FIG. 5A (or FIG. 5B, the same applies hereinafter) irradiates the light La so that at least one substrate W is included in the illumination region S. Therefore, if the imaging is successful, the imaging unit 52 can obtain the image 54 in the imaging screen. The image 54 includes, the bright region 54a corresponding to at least a part of the edge Wa of the single substrate W along the longitudinal direction (along the X axis) shown in FIGS. 6 and 7, and the dark region 54b corresponding to the space between the substrates W. In FIG. 8, the boundary between the bright region 54a and the dark region 54b is defined as the image shading boundary line 54ab.

The mapping sensor 20 can move in the vertical direction, with the vertical (the Z-axis direction) movement of door 14. Specifically, as shown in FIGS. 1A and 1B, the mapping sensor 20 moves downward from the substrate W located at the top of the plurality of substrates W toward the substrate W located at the bottom of the same. That is, the mapping sensor 20 moves relative to the planes of the substrate W in a substantially perpendicular direction. The substrate W is arranged in the container 2 at predetermined intervals in the Z-axis direction.

Then, the mapping sensor 20 acquires the image 54 on the imaging screen as shown in FIG. 8, when the door 14 is moving downward at a position a predetermined distance away from the substrate W. A focal length, an angle of the view, etc., of the imaging unit 52 are appropriately adjusted so that the image 54 can be appropriately acquired at the predetermined distance.

The control unit 40 records the captured image 54 acquired by the mapping sensor 20 in a data recording unit (not shown). The control unit 40 shown in FIGS. 1A and 1B may output such as the captured image 54 shown in FIG. 8 to a display monitor (not shown). Further, a position detection signal indicating a position relative to the substrate W of the mapping sensor 20 that moves downwards input to the control unit 40 from the position detection sensor 60.

The position detecting sensor 60 will be briefly described. As shown in FIG. 1A, the elongated sensor dog 18 is mounted to the rod 17 along the Z-axis direction. The position detecting sensor 60 is attached to the drive unit 16, and moves up and down along the sensor dog 18 as the drive unit 16 moves up and down.

The position detecting sensor 60 is such as a transmissive optical sensor having a light irradiation unit and a light receiving unit (not shown), arranged to face each other in the left-right direction with the sensor dog 18 interposed therebetween. According to the position detecting sensor 60, the light receiving unit moves up and down along the sensor dog 18 while receiving the detecting light from the light irradiation unit, and outputs the position detecting signal, corresponding to a light receiving result by the light receiving unit, to the control unit 40.

A cam with a slit (a slit cam) is an example of the sensor dog 18. A plurality of slits is arranged in the slit cam at regular intervals in the vertical direction. The slit position of each slit is detected by the position detecting sensor 60 at the same time as the image 54 is acquired by the mapping sensor 20. The number and pitch of the slits correspond to the number and pitch of the plurality of storage shelves 8 provided in the container 2. With the configuration above, the control unit 40 can grasp the relative position of the mapping sensor 20 with respect to the substrate W based on the position detecting signal detected by the position detecting sensor 60.

Thus, the control unit 40 can grasp which image 54 of the substrate W stored in a step of the storage shelves 8 is the image 54 obtained by the mapping sensor 20. Then, the control unit 40 can record the image 54 acquired by the mapping sensor 20 in a data recording unit corresponding to the storage position of the substrate W in the container 2.

The mapping sensor 20 receives an instruction from the control unit 40 and moves downward while acquiring the image 54 of the substrate W. Namely, as shown in FIG. 5A, the light emitting unit 50 irradiates the light La for imaging toward the substrate W, and the imaging unit 52 performs imaging of the reflected light of the light La irradiated by the light emitting unit 50, and acquires the image 54. The light forming the image 54 may include a light from another light source (for example, a light from the outside of the container 2) in addition to the reflected light of the light La.

At this time, since the imaging unit 52 shown in FIG. 5A performs imaging the imaging surface V intersecting the optical axis Oa of the light La to acquire the image 54, the image 54 viewed from the mapping sensor 20 side can be obtained. Then, the control unit 40 can record the image 54 acquired by the mapping sensor 20 in a data recording unit (not shown) corresponding to the storage position of the substrate W in the container 2, and can display on a monitor when necessary.

Next, the arrangement detector of the substrate W, including the mapping sensor 20 as an imaging means and the control unit 40 as a control means, both shown in FIGS. 1A and 1B are described in detail based on FIGS. 2A, 2B, and 8 to 11D.

Figure 2A:
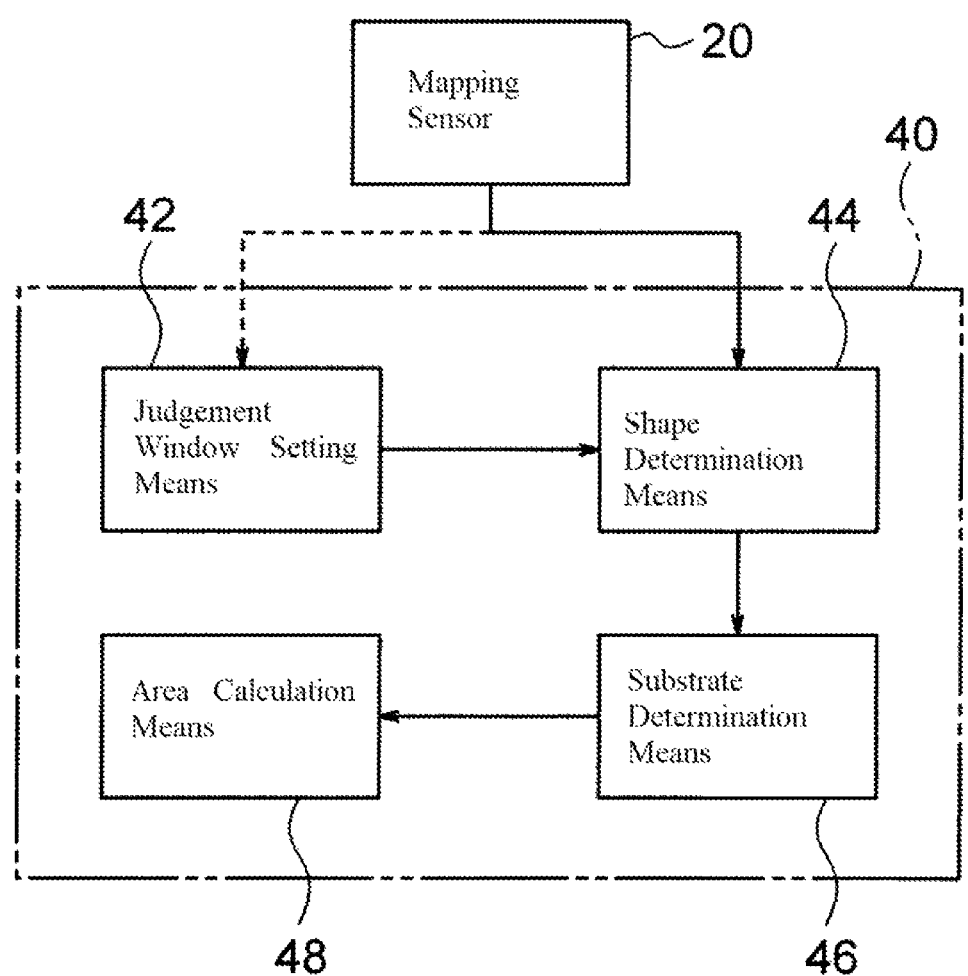
FIG. 2A is a block diagram showing a control function of the control unit shown in FIGS. 1A and 1B.

As shown in FIG. 2A, the control unit 40 of the embodiment includes at least a judgement window setting means 42, a shape determination means 44, a substrate determination means 46, and an area calculation means 48. These means 42 to 46 may be an exclusive control circuit in the control unit 40, or may be a control program of the computer.

Figure 9A:
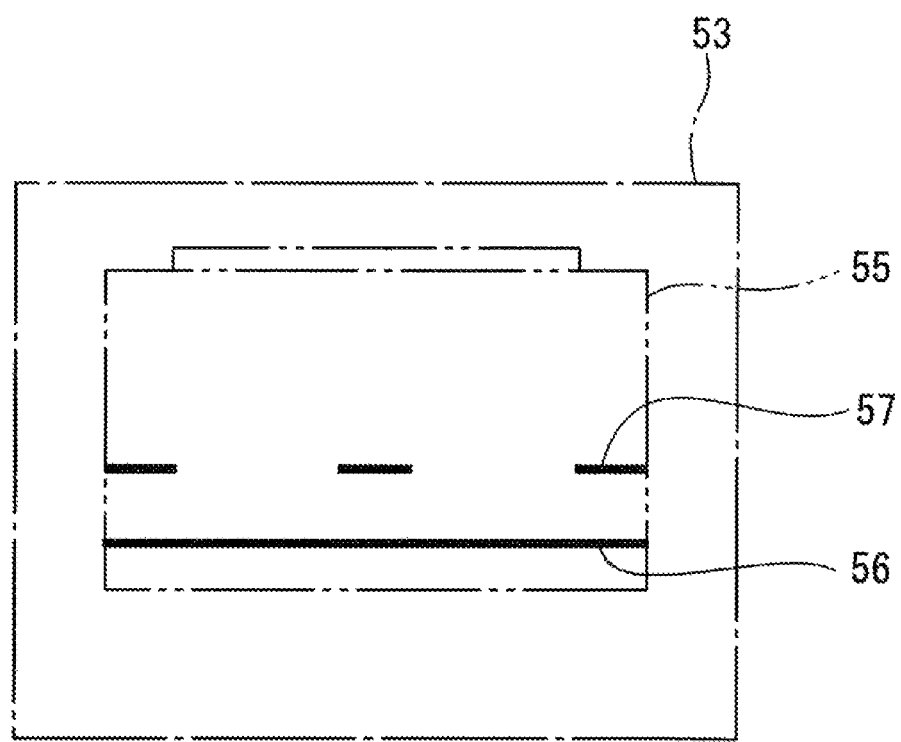
FIG. 9A is a schematic view showing an example of the judgement window to be superimposed and displayed on an actual imaging screen imaged by the mapping sensor shown in FIG. 5A.

The judgement window setting means 42 shown in FIG. 2A sets a first reference line 56 and a second reference line 57 shown in FIG. 9A in a judgement window 55, based on the bright region 54a of the master image 54α shown in FIG. 8 corresponding to the edge Wa of the single substrate W shown in FIG. 7, along a pair of image shading boundary line 54ab substantially parallel with a width corresponding to the thickness of the edge Wa.

The master image 54α may be created from an actual image captured by imaging an actual single substrate W shown in FIG. 7 using the mapping sensor 20, or may be created from an image obtained by imaging an actual single substrate W shown in FIG. 7 in advance using another camera or the like under the same conditions as the mapping sensor. Further, the judgement window 55 is set inside a search window 53, and is possible to make vertical/horizontal movement and rotation, while searching the image shading boundary line 54ab considering the reference lines 56 and 57.

The shape determination means 44 shown in FIG. 2A determines a shape matching rate by superimposing the judgement window 55 shown in FIG. 9A set by the judgement window setting means 42 on the image 54 shown in FIG. 9B1 captured by the mapping sensor (imaging means) 20 shown in FIG. 2A.

The substrate determination means 46 as the object judgement means shown in FIG. 2A judges that the substrate does not exist and the light blurring 54c exists in the judgement window 55 shown in FIG. 9C1 superimposed on the image captured by the matching sensor 20 shown in FIG. 2A, when the shape matching rate determined by the shape determination means 44 is equal to or less than a predetermined value, such as shown in FIG. 9D1.

The light blurring 54c is often formed by an entrance of an external light inside the container 2, for example, when the container body 3 of the container 2 shown in FIG. 1A has a transparent monitoring window or when the container body 3 itself is transparent. Alternatively, the reflected light of the illumination light may also cause the light blurring 54c.

When the substrate determination means 46 determines that the substrate W shown in FIG. 7 exists, the area calculation means 48 shown in FIG. 2A search for a pair of substantially parallel image shading boundary lines 54ab based on the actual image 54 in an area window 58 superimposing the judgement window 55 shown in FIG. 9B2.

In case when a pair of substantially parallel image shading boundary lines 54ab based on the actual image 54 shown in FIG. 9B2 is observed, the area calculation means 48 shown in FIG. 2A calculates an area between the pair of image shading boundary lines 54ab within a predetermined length along the pair of image shading boundary lines 54ab in the area window 58 of the judgement window 55. The area obtained by the calculation is shown by a diagonal hatching (such as a green part in the actual image) inside the area window 58 of FIG. 9B2. It is determined that the substrate is a single substrate W (see FIG. 7) when the area obtained by the calculation is within a predetermined normal range.

In case when a pair of substantially parallel image shading boundary lines 54ab based on the actual image 54 shown in FIG. 9C2 is observed, the area calculation means 48 shown in FIG. 2A calculates an area between the pair of image shading boundary lines 54ab within a predetermined length along the pair of image shading boundary lines 54ab in the area window 58 of the judgement window 55. The area obtained by the calculation is shown by a diagonal hatching (such as a red part in the actual image) inside the area window 58 of FIG. 9C2. It is determined that one substrate W overlay on another one substrate W (see FIG. 7), when the area obtained by the calculation is within the predetermined double-layer overlaying range.

As shown in FIG. 9A, according to the embodiment of the invention, the first reference line 56 is a continuous straight line in the judgement window 55, and the second reference line 57 is a collection of discontinuous line segments linearly arranged in the judgement window 55. The first reference line 56 and the second reference line 57 are substantially parallel, and the distance between them coincides with the width of the bright region 54a corresponding to the image of one substrate W in the master image 54α shown in FIG. 8.

According to the embodiment, the length of the gap between the discontinuous line segments of the second reference line 57 is preferably greater than the length of each segment. Further, when the total length of the discontinuous line segments of the second reference line 57 inside the judgement window 55 is L2 (not including the width of the gap) and the length of the first reference line 56 inside the same is L1, L2/L1 is preferably less than 1/2, and more preferably 45/100 to 25/100.

Further, inside the judgement window 55, discontinuous line segments of the second reference line 57 are preferably formed at least at the center and both ends along the second reference line 57, and the total number of the segments is preferably three or more. According to the embodiment, inside the judgement window 55, the first reference line 56 is arranged on the lower side and the second reference line 57 is arranged on the upper side, however, vice versa is also possible.

Figure 2B:
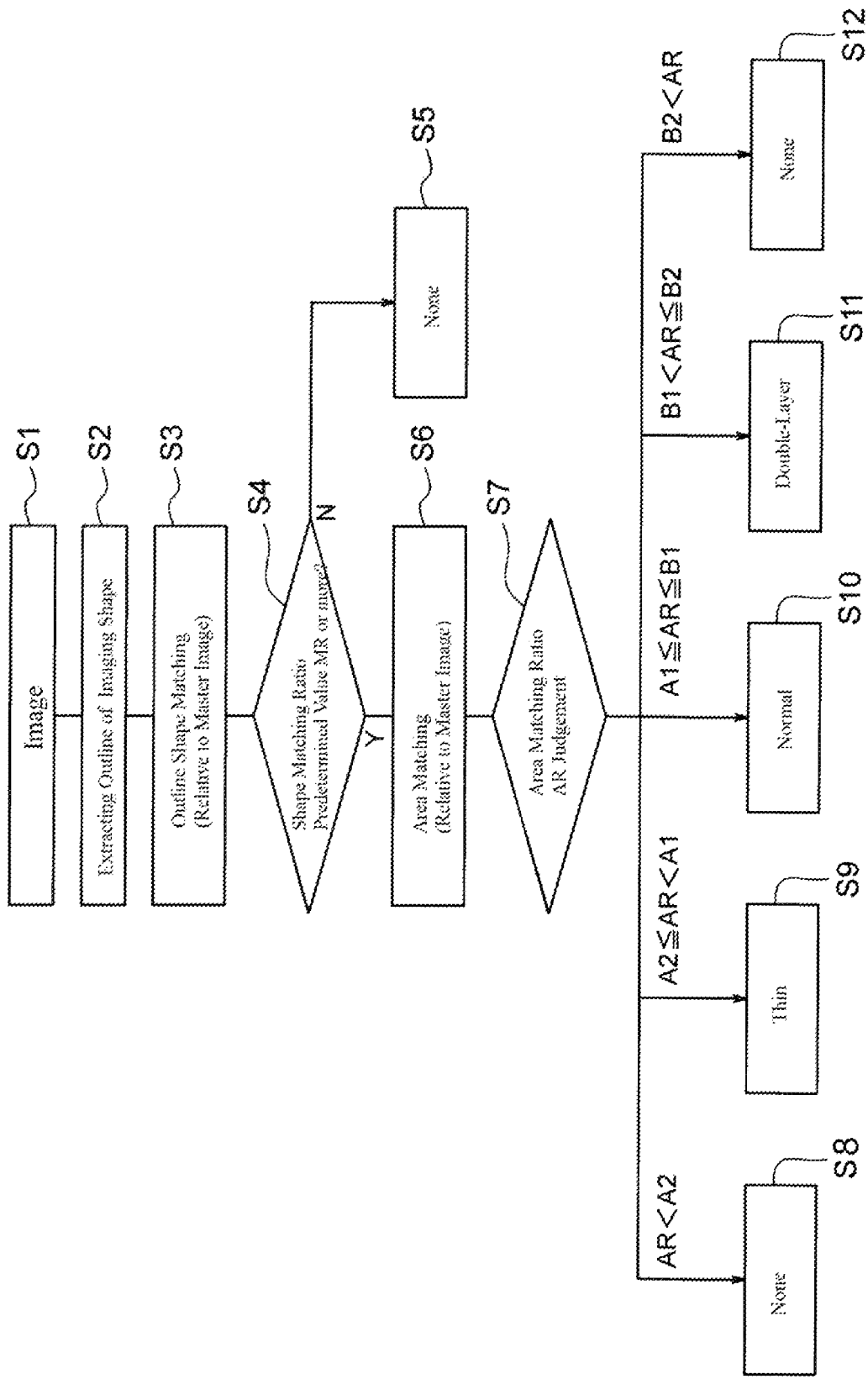
FIG. 2B is a flowchart showing an example of a control executed by the control unit shown in FIG. 2A.

Next, the operation of the control unit 40 shown in FIG. 2A is described primarily based on FIG. 2B. When the imaging process starts in step S1 shown in FIG. 2B, the mapping sensor 20 shown in FIG. 1A moves downward along the Z-axis together with the door 14, while taking the image of the edge Wa of the substrate W inside the container 2 (see FIGS. 6 and 7) within a predetermined range, e.g. within the illumination area S.

The control unit 40 shown in FIG. 2A is also connected to a recording device and a display device (not shown). As shown in FIG. 9B1, on the image 54 displayed on the display device, the search window 53 and the judgement window 55 are also displayed in a superimposing manner, and the first reference line 56 and the second reference line 57 are displayed in the judgement window 55. The image 54 is recorded in the recording device together with or separately from these windows 53, 55 and the reference lines 56, 57.

At step S2 shown in FIG. 2B, the shape determination means 44 shown in FIG. 2A searches and extracts such as the image shading boundary line 54ab (an outline of the imaging shape), a boundary between the bright region 54a and a dark region 54b of the image 54 shown in FIG. 9B1. Specifically, the shape determination means 44 moves the judgement window 55 shown in FIG. 9B1 in the vertical and horizontal directions and the rotational direction inside the search window 53, and search for a position where the first reference line 56 and the second reference line 57 can be respectively close to the image shading boundary lines 54ab.

Next, in step S3 shown in FIG. 2B, the shape determination means 44 shown in FIG. 2A proceeds the matching process (an outline shape matching or a comparison process) between the first reference line 56, the second reference line 57 respectively corresponding to the master image 54α shown in FIG. 8 and the actual image shading boundary line 54ab of the actual image 54.

Next, in step S4, it determines whether the shape matching ratio is a predetermined value MR or more. For example, as shown in FIG. 9B1, since the first reference line 56 coincides with the lower image shading boundary line 54ab and the second reference line 57 coincides with the upper image shading boundary line 54ab, the shape matching rate becomes close to 100% and becomes the predetermined value MR (e.g. 70%) or more, and the process proceeds to step S6 shown in FIG. 2B.

Further, such as shown in FIG. 9C1, since the bright region 54a corresponds to the double-layered substrate, the first reference line 56 coincides with the lower image shading boundary line 54ab, and the second reference line 57 does not coincide the upper image shading boundary line 54ab. However, the second reference line 57 is the dotted lines where their gaps in between are greater than the length of each dotted line. The total shape matching ratio between the second reference line 57 and the first reference line 56 becomes 74% which is the predetermined value MR (e.g. 70%) or more, and the process proceeds to step S6 shown in FIG. 2B.

The total shape matching rate of the second reference line 57 and the first reference line 56 becomes close to 0% when the light blurring 54c shown in FIG. 9D1 is seen in the image 54. This is due to the influences of an external light from an observation window different from the storage port 4 of the container 2 shown in FIG. 1A, the reflected light from the illumination light, etc. In this case, the shape matching rate becomes less than a predetermined value MR (e.g. 70%), the process proceeds to step S5 shown in FIG. 2B, and the substrate determination means 46 shown in FIG. 2A determines that a bright region corresponding to the substrate W in the judgement window 55 does not exist.

Specific numerical values of the predetermined value MR can be adjusted. Thus, the control unit 40 shown in FIG. 2A can detect the bright region 54a corresponding to the single substrate W shown in FIG. 9B1 and the bright region 54a corresponding to the double-layered substrate W shown in FIG. 9C1, separately from the light blurring.

In step S6 shown in FIG. 2B, the area calculation means 48 shown in FIG. 2A performs the area matching process based on the master image 54α shown in FIG. 8. That is, the area calculation means 48 shown in FIG. 2A searches for a pair of substantially parallel image shading boundary lines 54ab based on the actual image 54 in the area window 58 superimposing the judgement window 55 shown in FIG. 9B2.

The area calculation means 48 shown in FIG. 2A calculates an area between the pair of image shading boundary lines 54ab within a predetermined length along the pair of image shading boundary lines 54ab in the area window 58 of the judgement window 55 shown in FIG. 9B2. The area obtained by the calculation is shown by a diagonal hatching (such as a green part in the actual image) inside the area window 58 of FIG. 9B2. The area obtained by the calculation is matched with the area obtained by the area window 58 with respect to the master image 54α shown in FIG. 8 under the same conditions, and the matching rate AR is calculated.

Next, in step S7 shown in FIG. 2B, when the area matching ratio AR obtained in step S6 is such as A1 to B1, the process proceeds to step S10. Then the area calculation means 48 shown in FIG. 2A judges a normal determination. The determination criterion A1 is such as 70%, and B1 is such as 130%. That is, if the area matching rate AR is within 100%±30%, it can be determined that the bright region 54a shown in FIG. 9B2 corresponds to the single substrate W shown in FIGS. 6 and 7.

Next, in step S7 shown in FIG. 2B, when the area matching ratio AR obtained in step S6 is such as larger than B1 and B2 or less, the process proceeds to step S11. Then the area calculation means 48 shown in FIG. 2A performs to determine the double-layer. The determination criterion B1 is such as 130%, and B2 is such as 300%. That is, when the area matching rate AR is larger than 130% and 300% or less, it can be determined that the state is as shown in FIG. 9C2, and it can be judged that the two substrates W (see FIG. 7) overlay.

Further, in step S7 shown in FIG. 2B, when the area matching ratio AR obtained in step S6 is such as larger than B2, the process proceeds to step S12. Then, the area calculation means 48 shown in FIG. 2A determines that it is not a single substrate nor double-layer substrates. That is, when the area matching rate AR is larger than 300%, it is not in the state shown in FIG. 9B2, nor is it in the state shown in FIG. 9C2; and it is considered that the substrate W does not exist.

Further, in step S7 shown in FIG. 2B, when the area matching rate AR obtained in step S6 is, for example, A2 or more and smaller than A1, the process proceeds to step S9. Then, area calculation means 48 shown in FIG. 2A determines that the substrate is thin. The determination criterion A1 is such as 70%, and A2 is such as 15%. That is, when the area matching rate AR is 15% or more and less than 70%, the area calculation means 48 can determine that, for some reason, the substrate W (See FIG. 7) is imaged thinly or something other than the substrate W is imaged.

Further, in step S7 shown in FIG. 2B, the area matching ratio AR obtained in step S6 is such as less than A2, the process proceeds to step S8, the area calculation means 48 shown in FIG. 2A determines that the substrate W is not captured. That is, the substrate W does not exist when the area matching ratio AR is less than 15%. The above-mentioned determination reference values such as A1, A2, B1, and B2 can be appropriately changed according to the type and thickness of the substrate W, the intensity and brightness of illumination, etc.

According to the arrangement detector for substrates including the mapping sensor 20 and the control unit 40 of the embodiment, as shown in FIG. 9A, the first reference line 56 is a continuous straight line in the judgement window 55, and the second reference line 57 is a collection of discontinuous line segments arranged linearly in the judgement window 55. Thus, the light blurring 54c in the image 54 shown in FIG. 9D1 lowers the shape matching rate of the combination of the first reference line 56 of the continuous straight line and the second reference line 57 of the discontinuous dotted line.

Therefore, in step S4 shown in FIG. 2B, when the shape matching rate is the predetermined value MR or less, the process proceeds to step S5. And there will be a little risk of mistaking the light blurring 54c in the captured image 54 as shown in FIG. 9D1 for the normal substrate W. Further, in a state where two substrates W are arranged to mutually overlap as shown in FIG. 9C1, the matching rate of a combination of a continuous straight first reference line 56 and discontinuous dotted second reference line 57 is, for example, about 74%. The matching rate is significantly higher than that in the case of the light blurring, and it can be clearly distinguished from the light blurring, and there is little possibility of being mistaken for the light blurring.

As described above, according to the arrangement detector of the embodiment, the observer does not constantly observe the display monitor screen, eliminates erroneous judgment due to the light blurring, and automatically and quickly distinguish the normal substrate arrangement and the double-layered substrate arrangement. Further, in the embodiment, for example, the operator may grasp the captured image 54 via the data recording unit or the display monitor, or may grasp a storage state of each substrate W based on the captured image 54.

For example, it is also possible to grasp on the display screen the presence or absence of the overlaying arrangement in which the substrates W overlay and stored in the same storage shelf 8 shown in FIG. 7, the presence or absence of an oblique arrangement in which the substrates W are stored in the storage shelves 8 in different steps, and the presence or absence of the stored substrate W in the storage shelves 8. In addition, the data recorded in the data recording unit can be analyzed manually or automatically.

Moreover, since the captured image 54 obtained by the mapping sensor 20 can be associated with the storage position of the substrate W in the container 2, it is possible to accurately grasp the storage position (that is, which step of the storage shelf 8) of a defective substrate W, if there is a substrate W in a defective accommodation state. Thereby, for example, it is possible to control the handling robot not to access the substrate W having the poor storage state.

By using the mapping sensor 20 integrally formed with the door 14 shown in FIGS. 1A and 1B, it is possible to capture image 54 shown in FIG. 9B1 as the door 14 moves downward. Therefore, an operation of the door 14 and a detection operation of the mapping sensor 20 do not have to be separated. Thus, the state of the plurality of substrates W can be detected at the same time as the lowering operation of the door 14, and the processing efficiency can be improved and the state of the substrate W can be detected at a high speed. Therefore, for example, the mapping work for detecting the presence or absence of the substrate W can be efficiently performed.

Further, since the state of the substrate W can be detected based on the captured image 54, a state of the substrate W is more accurate compared to the case of using a general reflection type optical sensor that performs detection by using the reflection of the detected light. That is, in the case of the conventional reflective light sensor, the detection accuracy tends to decrease due to the influence of, for example, a positional deviation of the detected light with respect to the object (work), the degree of reflection of the detected light, or the amount of reflected light of the detected light.

According to the load port 1, having the detector of the embodiment, the state of the substrate W can be detected based on the captured image 54, so that there is no need for the mapping sensor 20 to enter the container 2 unlike the conventional transmission type optical sensor. Therefore, a configuration for allowing the mapping sensor 20 to enter the container 2 becomes unnecessary, and the configuration can be easily simplified accordingly. Therefore, the load port 1 can be miniaturized.

Further, according to the embodiment, since it is possible to deal with even a square substrate W, the state of the substrate W can be stably detected without being affected by the shape of the substrate W. Therefore, it is possible to flexibly deal with a wide variety of substrates W, and it is possible to provide the load port 1 which is easy to use and has excellent convenience.

Further, according to the embodiment, the captured image 54 is acquired reflecting only one substrate W. Thus, the state of the substrate W can be detected for each substrate W, and a high-precision detection can be performed.

The invention is not limited to the above-described embodiment, and can be variously modified within the scope of the invention.

For example, in the above-described embodiment, the mapping sensor 20 is independently installed on the upper part of the door 14, but the mapping sensor 20 may be arranged in plurality on the upper part or other part of the door 14 at predetermined intervals. Further, the mapping sensor 20 may be configured as another independent array detector for plate-shaped objects together with the control unit 20 separately from the load port 1.

Further, in the above embodiment, the substrate W has been described as an example as the plate-shaped object, but the invention is not limited thereto. For example, it may be a glass substrate for a semiconductor package.

Further, in the above embodiment, one mapping sensor 20 or 20A is attached to the door 14, but the number of the mapping sensors 20 or 20A is not limited to one and a plurality of the mapping sensors 20 or 20A may be attached. In this case, for example, a plurality of mapping sensors may be configured to image the same field of view of the substrate W, or may be configured to image different fields of view of the same.

Further, in the above embodiment, the sensor dog 18 is used to detect the relative positions of the mapping sensors 20 and 20A with respect to the substrate W, but the invention is not limited thereto where the sensor dog 18 is used. For example, the up and down movement of the door 14 may be detected by the encoder, and the relative positions of the mapping sensors 20 and 20A with respect to the substrate W may be detected based on the output signal from the encoder.

Comparative Example 1

Figure 10A:
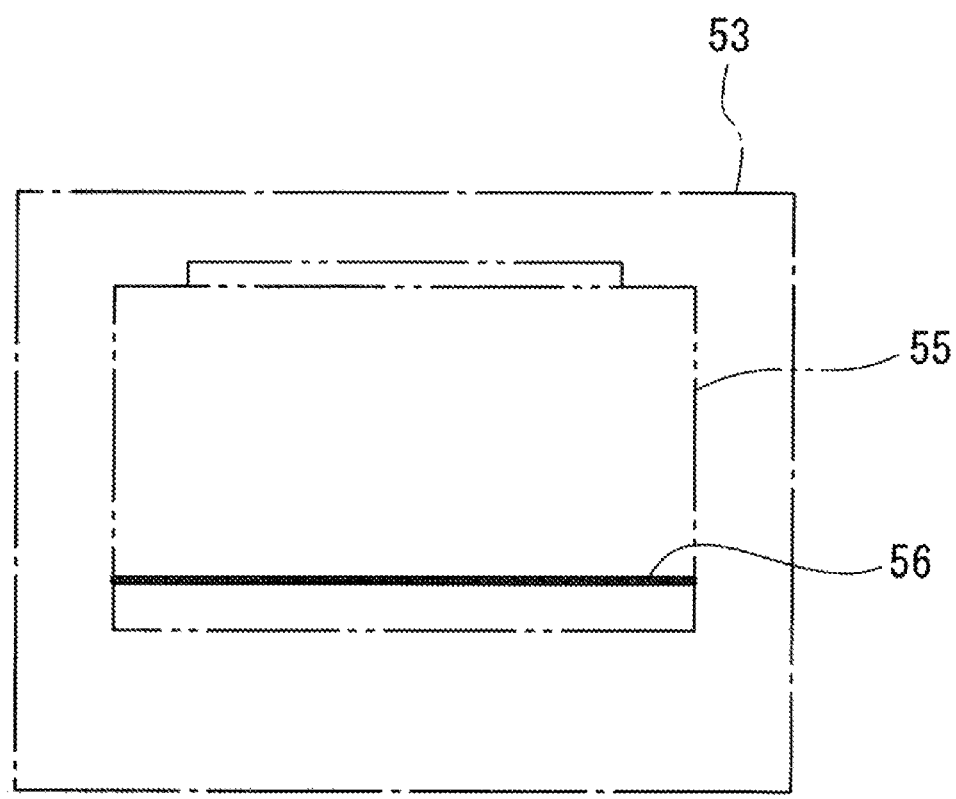
FIG. 10A is a schematic view showing an example of the judgement window that is superimposed and displayed on an actual imaging screen captured by the mapping sensor according to Comp. Ex. 1 of the invention.

Next, Comparative Example 1 of the invention will be described. In Comp. Ex. 1, as shown in FIG. 10A, it was the same as the above-described embodiment of the invention except that only the first reference line 56 exists in the judgement window 55.

In Comp. Ex. 1, for example, as shown in FIG. 10B1, the first reference line 56 coincided with the lower image shading boundary line 54ab, and the shape matching rate became close to 100%. The matching rate can also be determined, and a single substrate W can be detected, as shown in FIG. 10B2.

Further, according to Comp. Ex. 1, as shown in FIGS. 10C1 and 10C2, it was easy to detect the region 54a corresponding to the double-layered substrate W. However, in Comp. Ex. 1, as shown in FIGS. 10D1 and 10D2, it became easy to react to the light blurring 54c. In Comp. Ex. 1, for example, the shape matching rate was 70 to 90%, the area matching rate was 120 to 290%, and there was a high possibility that the light blurring 54c is mistaken for a single substrate or a double-layered substrate.

Comparative Example 2

Figure 11A:
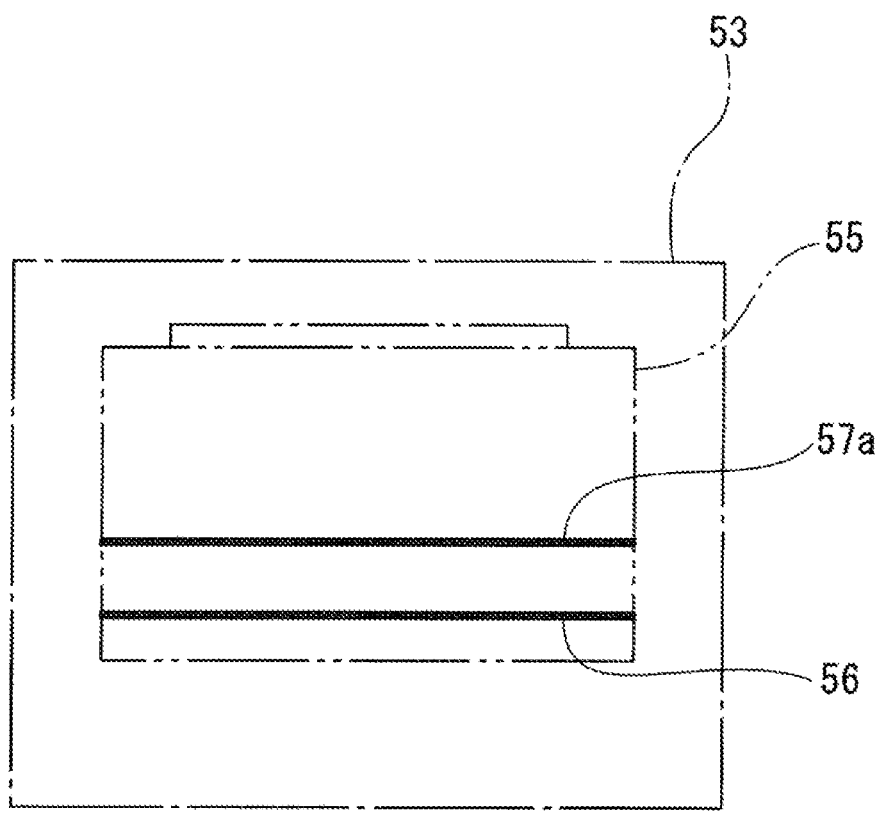
FIG. 11A is a schematic view showing an example of the judgement window that is superimposed and displayed on an actual imaging screen captured by the mapping sensor according to Comp. Ex. 2 of the invention.

Next, Comp. Ex. 2 of the invention will be described. Comp. Ex. 2 is the same as the embodiment of the invention except that a continuous linear first reference line 56 and a continuous linear second reference line 57a existed in the judgement window 55, as shown in FIG. 11A.

In Comp. Ex. 2, for example, as shown in FIG. 11B1, the first reference line 56 coincided with the lower image shading boundary line 54ab, the second reference line 57a coincided with the upper image shading boundary line 54ab, and the shape matching rate was close to 100%. Further, as shown in FIG. 11B2, the area matching rate could also be determined, and a single substrate W could be detected. Further, in Comp. Ex. 2, as shown in FIG. 11D1, the shape matching rate was close to 0% with respect to the light blurring 54c, and the light blurring 54c was also easy to detect.

However, in Comp. Ex. 2, as shown in FIG. 11C1, the shape matching rate tended to be less than 50% in the region 54a corresponding to the double-layered substrate W, and there was a high possibility that it will be automatically determined that the bright region 54a corresponding to the double-layered substrate W is misidentified as no substrate.

Explanation of References

S . . . Illumination Area
W . . . Substrate (Plate-Shaped Object)
Wa . . . Edge
1 . . . Load Port
2 . . . Container
3 . . . Container Body
4 . . . Storage Port
5 . . . Lid
10 . . . Control Box
11 . . . Movable Table
12 . . . Frame
13 . . . Support Frame
14 . . . Door
15 . . . Opening
16 . . . Drive Unit
17 . . . Rod
18 . . . Sensor Dog
20, 20A . . . Mapping Sensor (Imaging Means)
40 . . . Control Unit
42 . . . Judgement Window Setting Means
44 . . . Shape Determination Means
46 . . . Substrate Determination Means (Object judgement means)
48 . . . Area Calculation Means
50 . . . Light Emitting Unit
52 . . . Imaging Unit (Imaging Means)
53 . . . Search Window
54 . . . Image
54α . . . Master Image
54a . . . Bright Region
54b . . . Dark Region
54ab . . . Image Shading Boundary Line
54c . . . Light Blurring
55 . . . Judgement window
56 . . . First Reference Line
57, 57a . . . Second Reference Line
58 . . . Area Window
60 . . . Position Detecting Sensor

What is claimed is:

1. An arrangement detector for plate-shaped objects comprising;
an imaging means, relatively movable in a substantially perpendicular direction to a plane of the plate-shaped objects, and capable of imaging at least a part of one of the plate-shaped objects along an edge of the one of the plate-shaped objects in an imaging screen, with respect to the plate-shaped objects arranged at predetermined intervals in a container,
a judgement window setting means for setting a first reference line and a second reference line in a judgement window along a pair of substantially parallel image shading boundary lines, with a width corresponding to a thickness of an edge of a single plate-shaped object, based on a master image corresponding to the edge,
a shape determination means for determining a shape matching rate by superimposing the judgement window, set by the judgement window setting means, on the image captured by the imaging means, and
an object judgement means for judging the plate-shaped objects do not exist in the judgement window overlaid on the image captured by the imaging means, in case that the shape matching rate determined by the shape determination means is equal to or less than a predetermined value, wherein
the first reference line is a continuous straight line in the judgement window, and the second reference line is a collection of discontinuous line segments linearly arranged in the judgement window.

2. The arrangement detector for the plate-shaped objects according to claim 1, further comprising
an area calculation means for searching a pair of substantially parallel image shading boundary lines based on an actual image captured by the imaging means in the judgement window, in case that the object judgement means judges that the plate-shaped objects exist.

3. The arrangement detector for the plate-shaped objects according to claim 2, wherein
the area calculation means calculates an area between a pair of image shading boundary lines within a predetermined length along the pair of image shading boundary lines in the judgement window and judges that a single plate-shaped object is in the area, in case that a pair of substantially parallel image shading boundary lines based on the actual image is observed, and the area obtained by the calculation is within a predetermined normal range.

4. The arrangement detector for the plate-shaped objects according to claim 2, wherein
the area calculation means calculates an area between the pair of image shading boundary lines within a predetermined length along the pair of image shading boundary lines in the judgement window and judges that two plate-shaped objects are in the area, in case that a pair of substantially parallel image shading boundary lines based on the actual image is observed, and the area obtained by the calculation is within a predetermined double-layer overlaying range.

5. The arrangement detector for the plate-shaped objects according to claim 1, wherein
a length of a gap between a discontinuous line segments of the second reference line is greater than a length of each segment.

6. A load port comprising an arrangement detector for a plate-shaped object according to claim 1.

7. The arrangement detector for the plate-shaped objects according to claim 3, wherein
the area calculation means calculates an area between the pair of image shading boundary lines within a predetermined length along the pair of image shading boundary lines in the judgement window and judges that two plate-shaped objects are in the area, in case that a pair of substantially parallel image shading boundary lines based on the actual image is observed, and the area obtained by the calculation is within a predetermined double-layer overlaying range.

8. The arrangement detector for the plate-shaped objects according to claim 4, wherein
a length of a gap between a discontinuous line segments of the second reference line is greater than a length of each segment.

* * * * *